US012459275B2

(12) United States Patent
Kajihara

(10) Patent No.: US 12,459,275 B2
(45) Date of Patent: Nov. 4, 2025

(54) PRINT DATA GENERATION APPARATUS, CONTROL METHOD OF PRINT DATA GENERATION APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Mikihiro Kajihara, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 164 days.

(21) Appl. No.: 18/394,490

(22) Filed: Dec. 22, 2023

(65) Prior Publication Data

US 2024/0208252 A1 Jun. 27, 2024

(30) Foreign Application Priority Data

Dec. 26, 2022 (JP) ................................ 2022-209032

(51) Int. Cl.
*B41J 11/42* (2006.01)
*B41J 2/32* (2006.01)

(52) U.S. Cl.
CPC ................ *B41J 11/42* (2013.01); *B41J 2/32* (2013.01)

(58) Field of Classification Search
CPC ... B41J 11/42; B41J 29/393; B41J 2/32; B41J 2/325; B41J 3/4075; B41J 13/00; B41J 13/0009; B41J 15/00; B41J 15/04; B41J 15/044; B41J 15/046
See application file for complete search history.

(56) References Cited

U.S. PATENT DOCUMENTS

2005/0012950 A1* 1/2005 Kurashina .............. B41J 3/4075 358/1.18
2009/0041527 A1* 2/2009 Ohashi ............... G06K 7/10336 400/613
2010/0060919 A1 3/2010 Tanaka et al.
2012/0039651 A1* 2/2012 Yamaguchi ................ B41J 3/50 400/613

FOREIGN PATENT DOCUMENTS

JP H11-20249 A 1/1999
JP 2010-66983 A 3/2010
JP 2013-37393 A 2/2013

* cited by examiner

*Primary Examiner* — Kristal Feggins
(74) *Attorney, Agent, or Firm* — Oliff PLC

(57) ABSTRACT

A print data generation apparatus decides, when a center arrangement function is set for an object in a case in which a tape length automatic function is selected, a tape length such that a position separated by a margin length in a first direction from an object front end position, which is a position of an end portion of the object for which the center arrangement function is set in the first direction, is a tape front end position and a position separated by the margin length in a second direction from an object rear end position of the object for which the center arrangement function is set is a tape rear end position.

9 Claims, 16 Drawing Sheets

70

| | A | B | C |
|---|---|---|---|
| 1 | ABC | 12345 | |
| 2 | DE | 678 | |

PRINT DATA GENERATION APPARATUS, CONTROL METHOD OF PRINT DATA GENERATION APPARATUS, AND NON-TRANSITORY COMPUTER-READABLE STORAGE MEDIUM STORING PROGRAM

The present application is based on, and claims priority from JP Application Serial Number 2022-209032, filed Dec. 26, 2022, the disclosure of which is hereby incorporated by reference herein in its entirety.

BACKGROUND

1. Technical Field

The present disclosure relates to a print data generation apparatus, a control method of a print data generation apparatus, and a non-transitory computer-readable storage medium storing a program.

2. Related Art

As disclosed in JP-A-11-020249, an apparatus is known, which has a center arrangement function of arranging an object at a center of a tape in a tape feeding direction. By setting the center arrangement function, a user can arrange the object on the tape with good appearance. In addition, an apparatus is also known, which can select any one of a tape length fixing function of deciding a tape length to be a fixed length designated by the user, and a tape length automatic function of automatically setting the tape length in accordance with a rear end position of the object arranged on the tape. By selecting the tape length automatic function, the user can reduce the tape consumption as much as possible.

The apparatus in the related art can receive the setting of the center arrangement function when the tape length fixing function is selected, but cannot receive the setting of the center arrangement function when the tape length automatic function is selected. Therefore, when the tape length automatic function is selected, the user cannot obtain a print result utilizing both functions of the tape length automatic function and the center arrangement function.

SUMMARY

The present disclosure is a print data generation apparatus that generates print data for causing a tape printing apparatus to print an object on a tape fed in a first direction, the print data generation apparatus including a reception section that receives selection of any one of a tape length fixing function of deciding a tape length to be a fixed length designated by a user and a tape length automatic function of deciding the tape length by setting, as a tape rear end position, a position separated by a margin length in a second direction opposite to the first direction from an object rear end position, which is a position of an end portion of the object in the second direction, and setting, for the object, of a center arrangement function of arranging the object at a center of the tape in the first direction, and a generation section that generates the print data, in which the generation section arranges, when the center arrangement function is set for the object in a case in which the tape length fixing function is selected, the object for which the center arrangement function is set at the center of the tape in the first direction while maintaining the fixed length, and decides, when the center arrangement function is set for the object in a case in which the tape length automatic function is selected, the tape length such that a position separated by the margin length in the first direction from an object front end position, which is a position of an end portion of the object for which the center arrangement function is set in the first direction, is a tape front end position and a position separated by the margin length in the second direction from the object rear end position of the object for which the center arrangement function is set is the tape rear end position, to generate the print data such that the object for which the center arrangement function is set is arranged at the center of the tape in the first direction.

The present disclosure is a control method of a print data generation apparatus that generates print data for causing a tape printing apparatus to print an object on a tape fed in a first direction, the control method including causing the print data generation apparatus to execute a reception step of receiving selection of any one of a tape length fixing function of deciding a tape length to be a fixed length designated by a user and a tape length automatic function of deciding the tape length by setting, as a tape rear end position, a position separated by a margin length in a second direction opposite to the first direction from an object rear end position, which is a position of an end portion of the object in the second direction, and setting, for the object, of a center arrangement function of arranging the object at a center of the tape in the first direction, and a generation step of generating the print data, in which in the generation step, when the center arrangement function is set for the object in a case in which the tape length fixing function is selected, the object for which the center arrangement function is set is arranged at the center of the tape in the first direction while maintaining the fixed length, and when the center arrangement function is set for the object in a case in which the tape length automatic function is selected, the tape length is decided such that a position separated by the margin length in the first direction from an object front end position, which is a position of an end portion of the object for which the center arrangement function is set in the first direction, is a tape front end position and a position separated by the margin length in the second direction from the object rear end position of the object for which the center arrangement function is set is the tape rear end position, to generate the print data such that the object for which the center arrangement function is set is arranged at the center of the tape in the first direction.

The present disclosure is a non-transitory computer-readable storage medium storing a program, the program causing a print data generation apparatus that generates print data for causing a tape printing apparatus to print an object on a tape fed in a first direction, to execute a reception step of receiving selection of any one of a tape length fixing function of deciding a tape length to be a fixed length designated by a user and a tape length automatic function of deciding the tape length by setting, as a tape rear end position, a position separated by a margin length in a second direction opposite to the first direction from an object rear end position, which is a position of an end portion of the object in the second direction, and setting, for the object, of a center arrangement function of arranging the object at a center of the tape in the first direction, and a generation step of generating the print data, in which in the generation step, when the center arrangement function is set for the object in a case in which the tape length fixing function is selected, the object for which the center arrangement function is set is arranged at the center of the tape in the first direction while maintaining the fixed length, and when the center arrangement function is set for the object in a case in which the tape length automatic function is selected, the tape length is decided such that a position separated by the margin length in the first direction from an object front end position, which is a position of an end portion of the object for which the center arrangement function is set in the first direction, is a tape front end position and a position separated by the margin length in the second direction from the object rear end position of the object for which the center arrangement function is set is the tape rear end position, to generate the print data such that the object for which the center arrangement function is set is arranged at the center of the tape in the first direction.

DESCRIPTION OF EMBODIMENTS

Hereinafter, a print data generation apparatus, a control method of a print data generation apparatus, and a non-transitory computer-readable storage medium storing a program will be described with reference to the accompanying drawings. It should be noted that the description will be made by using directions based on an XYZ orthogonal coordinate system or an X coordinate system in a part of drawings. However, these directions are merely for convenience of description and do not limit the following embodiments in any way.

First Embodiment

Figure 1:
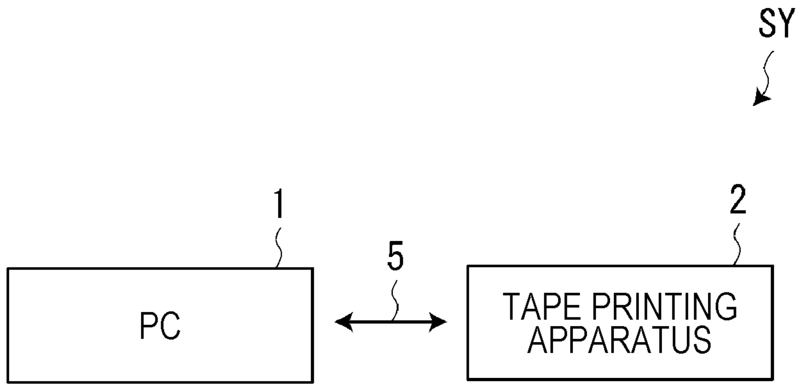
FIG. 1 is a system configuration diagram of a tape printing system.

FIG. 1 is a system configuration diagram of a tape printing system SY. The tape printing system SY includes a personal computer (PC) 1 and a tape printing apparatus 2, and the PC 1 and the tape printing apparatus 2 are communicably coupled via a cable 5. The PC 1 is an example of a "print data generation apparatus". It should be noted that the PC 1 and the tape printing apparatus 2 may be connected via wireless communication or may be connected via a network instead of the cable 5.

Figure 3:
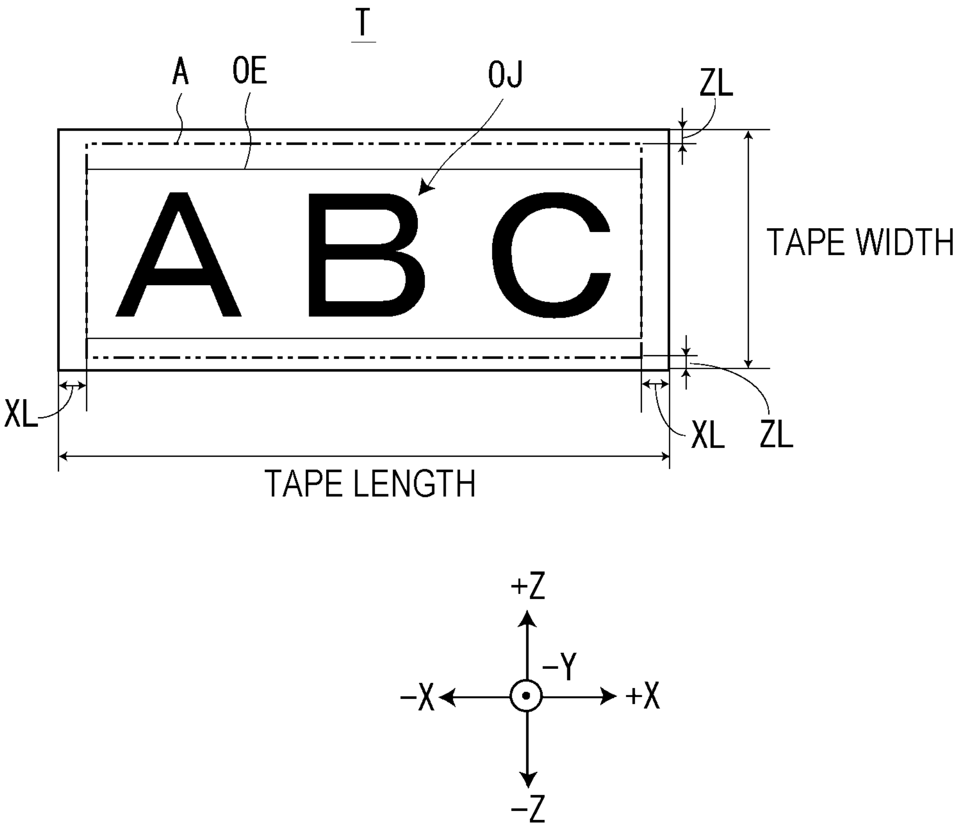
FIG. 3 is a diagram illustrating an example of a tape on which an object is printed.

As illustrated in FIG. 3, the PC 1 generates print data for performing printing on a tape T which is a print medium of the tape printing apparatus 2, and transmits the generated print data to the tape printing apparatus 2. The tape printing apparatus 2 prints an object OJ on the tape T based on the print data transmitted from the PC 1. The object OJ refers to a display element, such as a character or a figure.

Figure 8:
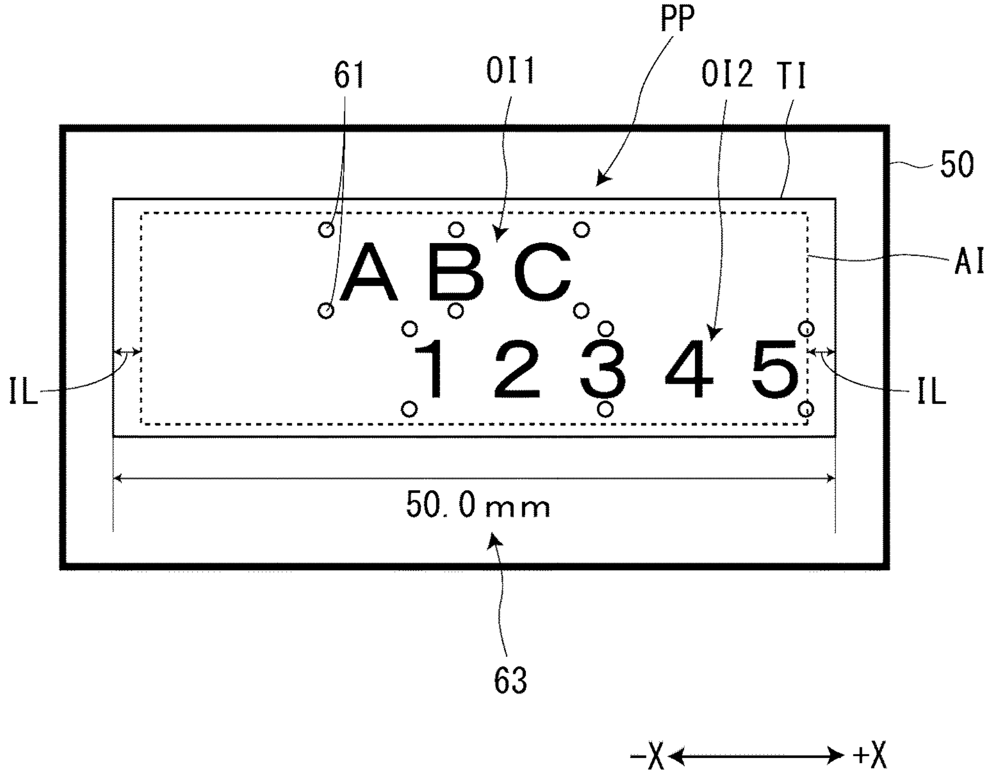
FIG. 8 is a diagram illustrating a display example of an editing area in which a first object image and a second object image are arranged on a tape image.

As illustrated in FIG. 8, the PC 1 displays, on a PC-side display 11, an editing area 50 for editing the object OJ. In the editing area 50, a print preview PP in which an object image OI simulating the object OJ is arranged on a tape image TI simulating the tape T is displayed. A user can perform an editing operation of the object OJ while checking the print result of the tape T by the print preview PP.

Figure 2:
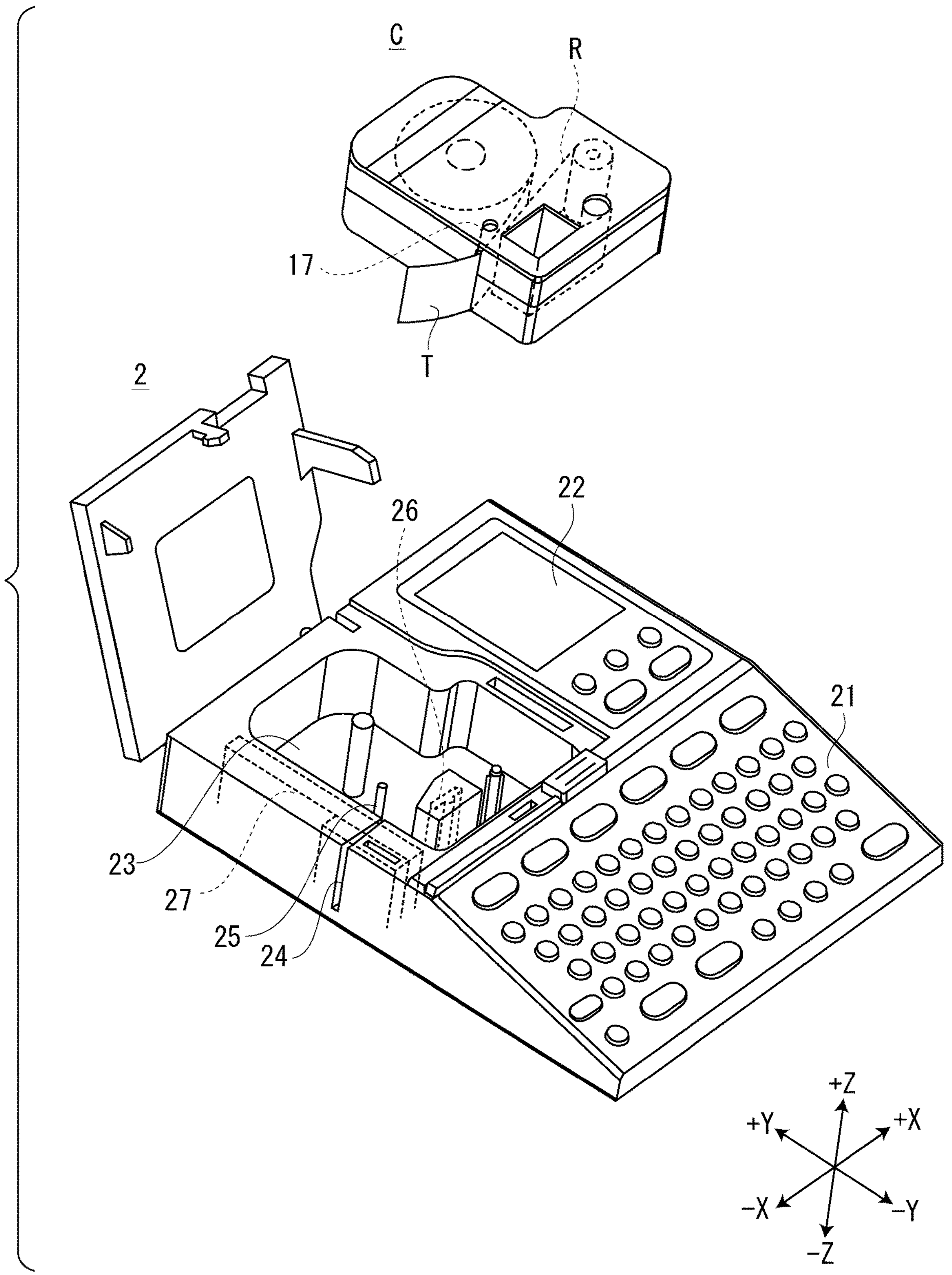
FIG. 2 is an external view of the tape printing apparatus and a tape cartridge.

FIG. 2 is an external view of the tape printing apparatus 2 and a tape cartridge C. The tape printing apparatus 2 includes an operation key group 21, a printing apparatus-side display 22, a cartridge mounting section 23, and a tape discharge port 24.

The operation key group 21 receives various operations of the user related to the printing of the tape T. The printing apparatus-side display 22 displays various information. It should be noted that the user can also perform the editing operation of the object OJ by using the operation key group 21 and the printing apparatus-side display 22, but in the present embodiment, the editing operation is performed by the PC 1. In addition, the tape printing apparatus 2 receives an editing result of the object OJ by the PC 1 as the print data and performs the printing based on the received print data.

The tape cartridge C is detachably mounted on the cartridge mounting section 23. The tape cartridge C accommodates the tape T and an ink ribbon R in a case thereof. In addition, the tape cartridge C is provided with a platen roller 17 that feeds the tape T.

A platen drive shaft 25 and a thermal head 26 are provided in the cartridge mounting section 23. The platen drive shaft 25 is engaged with the platen roller 17 in a state in which the tape cartridge C is mounted on the cartridge mounting section 23. The platen roller 17 feeds the tape T in a −X direction.

The thermal head 26 is provided at a position facing the platen roller 17 in a state in which the tape cartridge C is mounted on the cartridge mounting section 23. The thermal head 26 is driven to generate heat in accordance with the print data transmitted from the PC 1. As a result, an ink of the ink ribbon R is transferred to the tape T, and the object OJ based on the print data is printed on the tape T.

The tape T on which the printing is performed is discharged from the tape discharge port 24. A cutter 27 is provided between the cartridge mounting section 23 and the tape discharge port 24. The cutter 27 cuts the tape T in a Z axis direction. As a result, a printed portion of the tape T is cut away.

FIG. 3 is a diagram illustrating an example of the tape T on which the object OJ is printed. In the tape T, a print area A in which the object OJ can be printed is defined. In addition, the object OJ has an object area OE indicated by a thin line. The object area OE includes the entire object OJ, and is a rectangular area formed of two sides parallel to an X axis direction and two sides parallel to the Z axis direction. It should be noted that the example of FIG. 3 illustrates a case in which positions of end portions in the −X direction and positions of end portions in the +X direction of the object area OE and the print area A match each other. The −X direction is an example of a "first direction", and the +X direction is an example of a "second direction".

The print area A is an area in the X axis direction from a position separated by a first margin length XL in the +X direction from an end portion of the tape T in the −X direction to a position separated by the first margin length XL in the −X direction from an end portion of the tape T in the +X direction. The first margin length XL is an example of a "margin length". In addition, the print area A is an area in the Z axis direction from a position separated by a second margin length ZL in a −Z direction from an end portion of the tape T in a +Z direction to a position separated by the second margin length ZL in the +Z direction from an end portion of the tape T in the −Z direction.

In the following description, the first margin length XL and the second margin length ZL are fixed lengths. These first margin length XL and second margin length ZL may be predetermined lengths, may be lengths that can be optionally set by the user, or may be lengths uniformly set in accordance with a tape width.

In addition, in the following description, the position of the end portion of the tape T in the −X direction is referred to as a "tape front end position", and the position of the end portion of the tape T in the +X direction is referred to as a "tape rear end position". In addition, the position of the end portion of the print area A in the −X direction is referred to as a "print area front end position", and the position of the end portion of the print area A in the +X direction is referred to as a "print area rear end position". In addition, the position of the end portion of the object area OE in the −X direction is referred to as an "object front end position", and the position of the end portion of the object area OE in the +X direction is referred to as an "object rear end position". In addition, the length of the tape T in the X axis direction is referred to as a "tape length", and the length of the tape T in the Z axis direction is referred to as a "tape width".

Figure 4:
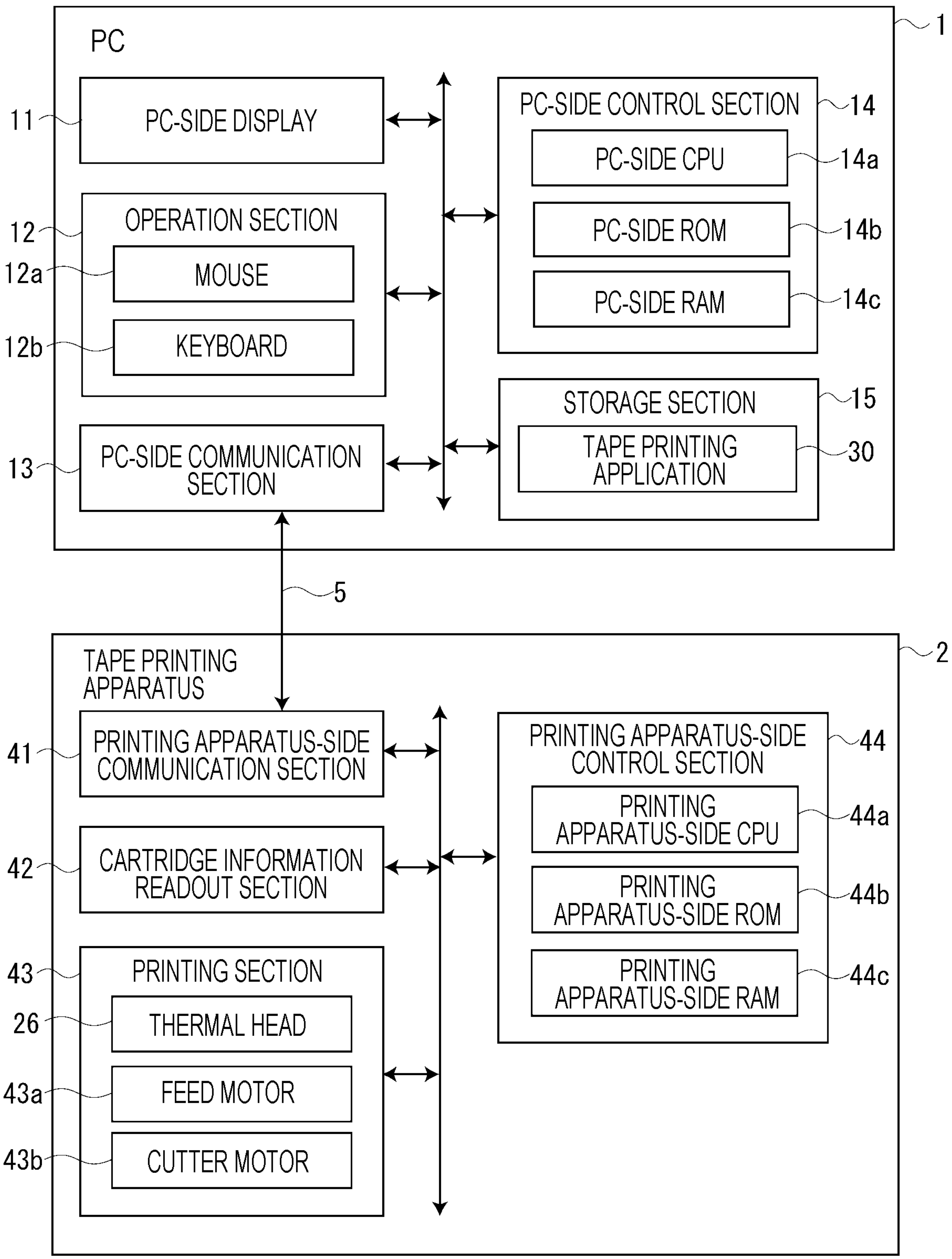
FIG. 4 is a block diagram illustrating a hardware configuration of a PC and a tape printing apparatus.

FIG. 4 is a block diagram illustrating a hardware configuration of the PC 1 and the tape printing apparatus 2. The PC 1 includes the PC-side display 11, an operation section 12, a PC-side communication section 13, a PC-side control section 14, and a storage section 15.

The PC-side display 11 displays various information, such as the editing area 50. The operation section 12 includes a mouse **12*a* and a keyboard 12*b*. The mouse 12*a* has, for example, a left button and a right button. The keyboard 12*b*** includes a character key or a number key.

The PC-side communication section 13 communicates with the tape printing apparatus 2 via the cable 5. For example, the PC-side communication section 13 transmits the print data to the tape printing apparatus 2, and receives, from the tape printing apparatus 2, cartridge information indicating a type of the tape cartridge C mounted on the tape printing apparatus 2.

The PC-side control section 14 includes a PC-side central processing unit (CPU) **14*a*, a PC-side read only memory (ROM) 14*b*, and a PC-side random access memory (RAM) 14*c***.

The PC-side CPU **14*a* performs various controls by loading and executing various programs stored in the PC-side ROM 14*b* or a storage section 15 described later on the PC-side RAM 14*c*. It should be noted that the PC-side control section 14 may use a hardware circuit, such as an application specific integrated circuit (ASIC), as a processor instead of the PC-side CPU 14*a***. The processor may have a configuration in which one or more CPUs and the hardware circuit, such as the ASIC, operate in cooperation with each other.

The PC-side ROM **14*b* stores a control program or control data that does not have to be rewritten. In addition, the PC-side RAM 14*c* is used as a work area for the PC-side CPU 14*a*** to perform various controls.

The storage section 15 is, for example, a hard disk drive, and stores a tape printing application 30. The tape printing application 30 is an example of a "program". The tape printing application 30 is an application program for performing display control of the editing area 50, generation of the print data, communication with the tape printing apparatus 2, and the like.

The tape printing apparatus 2 includes a printing apparatus-side communication section 41, a cartridge information readout section 42, a printing section 43, and a printing apparatus-side control section 44.

The printing apparatus-side communication section 41 communicates with the PC 1 via the cable 5.

The cartridge information readout section 42 optically reads a code image attached as a label to the tape cartridge C mounted on the cartridge mounting section 23, or reads out the cartridge information from a circuit substrate having a memory element provided in the tape cartridge C. Information indicating the tape width of the tape T accommodated in the tape cartridge C is included in the cartridge information.

The printing section 43 is a mechanism for performing the printing on the tape T, and includes the thermal head 26, a feed motor 43*a*, and a cutter motor 43*b*. The thermal head 26 includes a plurality of heat generating elements, and performs the printing by thermally transferring the ink from the ink ribbon R to the tape T. The feed motor 43*a* is a drive source that feeds the tape T. The cutter motor 43*b* is a drive source that drives the cutter 27.

The printing apparatus-side control section 44 includes a printing apparatus-side CPU 44*a*, a printing apparatus-side ROM 44*b*, and a printing apparatus-side RAM 44*c*.

The printing apparatus-side CPU 44*a* performs various controls by loading and executing the control program, such as firmware, stored in the printing apparatus-side ROM 44*b* on the printing apparatus-side RAM 44*c*. It should be noted that the printing apparatus-side control section 44 may use a hardware circuit, such as an ASIC, as a processor instead of the printing apparatus-side CPU 44*a*. The processor may have a configuration in which one or more CPUs and the hardware circuit, such as the ASIC, operate in cooperation with each other.

The printing apparatus-side CPU 44*a* performs the printing on the tape T fed out from the tape cartridge C based on the print data transmitted from the PC 1 by using the control program stored in the printing apparatus-side ROM 44*b*. In addition, when the printing apparatus-side CPU 44*a* receives a cartridge information request signal from the PC 1, the printing apparatus-side CPU 44*a* acquires the cartridge information via the cartridge information readout section 42 and transmits the acquired cartridge information to the PC 1.

Figure 5:
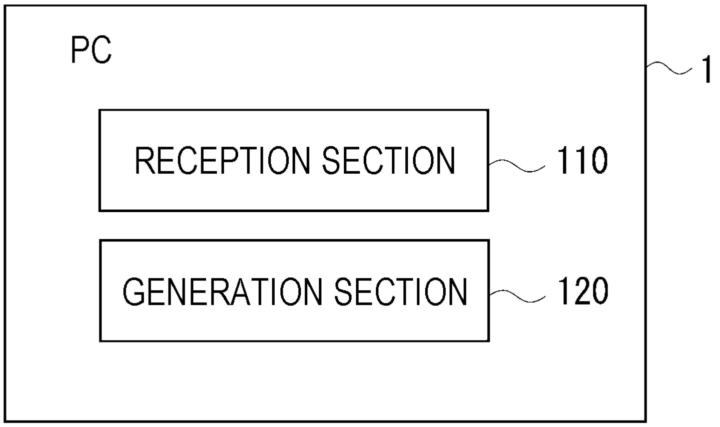
FIG. 5 is a block diagram illustrating a functional configuration of the PC.

A functional configuration of the PC 1 will be described with reference to FIG. 5. The PC 1 includes a reception section 110 and a generation section 120. All of these functions are functions realized by executing the tape printing application 30 by the PC-side CPU 14*a*.

The reception section 110 receives selection of any one of a tape length fixing function of deciding the tape length to be the fixed length designated by the user and a tape length automatic function of deciding the tape length by setting, as the tape rear end position, a position separated by the first margin length XL in the +X direction from the object rear end position, which is the position of the end portion of the object OJ in the +X direction. That is, the tape length automatic function is a function of deciding the tape length by using the object rear end position as the print area rear end position.

In addition, the reception section 110 receives the setting, for the object OJ, of a center arrangement function of arranging the object OJ at the center of the tape T in the X axis direction. The X axis direction is an example of a "first direction". It should be noted that the reception section 110 receives various selections or various settings by acquiring an operation signal when the user operates the mouse 12*a* or the keyboard 12*b* to select or set various functions. It should be noted that a step in which the reception section 110 receives the selection of any one of the tape length fixing function and the tape length automatic function and the setting of the center arrangement function is an example of a "reception step".

The generation section 120 generates the print data. In addition, when the center arrangement function is set for the object OJ in a case in which the tape length fixing function is selected, the generation section 120 arranges the object OJ for which the center arrangement function is set at the center of the tape T in the X axis direction while maintaining the fixed length. In addition, when the center arrangement function is set for the object OJ in a case in which the tape length automatic function is selected, the generation section 120 sets, as the tape front end position, a position separated by the first margin length XL in the −X direction from the object front end position, which is the position of the end portion of the object OJ for which the center arrangement function is set in the −X direction. Further, the generation section 120 decides the tape length such that a position separated by the first margin length XL in the +X direction from the object rear end position of the object OJ for which the center arrangement function is set is the tape rear end position. That is, when the center arrangement function is set for the object OJ in a case in which the tape length automatic function is selected, the generation section 120 decides the tape length such that the object front end position of the object OJ for which the center arrangement function is set is the print area front end position and the object rear end position of the object OJ for which the center arrangement function is set is the print area rear end position. In addition, by deciding the tape length in this way, the generation section 120 generates the print data such that the object OJ for which the center arrangement function is set is arranged at the center of the tape T in the X axis direction.

It should be noted that, when the center arrangement function is set, the generation section 120 changes the arrangement of the object OJ in the X axis direction and does not change the arrangement in the Z axis direction.

In addition, when the center arrangement function is set for a plurality of objects OJ in a case in which the tape length automatic function is selected, the generation section 120 decides the tape length as follows. It should be noted that, in the following description, among the objects OJ printed on the tape T, the object OJ having a longest length in the X axis direction is referred to as a "longest object". The generation section 120 performs the center position alignment in the X axis direction on the plurality of objects OJ, and decides the tape length such that a position separated by the first margin length XL in the −X direction from the object front end position of the longest object among the plurality of objects OJ is the tape front end position and a position separated by the first margin length XL in the +X direction from the object rear end position of the longest object is the tape rear end position. That is, when the center arrangement function is set for the plurality of objects OJ in a case in which the tape length automatic function is selected, the generation section 120 decides the tape length such that the object front end position of the longest object is the print area front end position and the object rear end position of the longest object is the print area rear end position.

It should be noted that the "center position alignment" means that the center positions of the objects OJ in the X axis direction are aligned, and does not mean that the object OJ is arranged at the center of the tape T in the X axis direction.

In addition, when the center arrangement function is set in a state in which the object OJ is selected, and a center arrangement attribute is not assigned to the selected object OJ, the generation section 120 assigns the center arrangement attribute to the selected object OJ. In addition, when the center arrangement function is set, the generation section 120 arranges the selected object OJ and the object OJ which is not selected but assigned in advance with the center arrangement attribute at the center of the tape T in the X axis direction.

In addition, when a specific operation including at least one of movement and size change is performed on the object OJ assigned with the center arrangement attribute, the generation section 120 cancels the center arrangement attribute. In the present embodiment, the specific operation includes character editing and figure editing in addition to the movement and the size change. The character editing means font change, character decoration, or the like performed when the object OJ is the character. In addition, the edited figure means enlargement, reduction, shape change, or the like performed when the object OJ is the figure.

In addition, when the editing setting of the object OJ is changed from the tape length automatic function to the tape length fixing function, the generation section 120 cancels the center arrangement attribute for all the objects OJ being edited in the editing area 50. That is, the operation of changing the editing setting from the tape length automatic function to the tape length fixing function is also one of the specific operations.

In addition, when the center arrangement function is set for a first object OJ and the center arrangement function is not set for a second object OJ in a case in which the tape length automatic function is selected, the generation section 120 does not change the position of the second object OJ with respect to the tape front end position and decides the tape length as follows. When a position separated by a total length of the first margin length XL and the length of the first object OJ in the +X direction from the tape front end position is located in the +X direction with respect to the object rear end position of the second object OJ, the generation section 120 decides the tape length such that a position separated by the first margin length XL in the +X direction from the object rear end position of the first object OJ is the tape rear end position. In addition, when a position separated by the total length of the first margin length XL and the length of the first object OJ in the +X direction from the tape front end position is not located in the +X direction with respect to the object rear end position of the second object OJ, the generation section 120 decides the tape length such that a position separated by the first margin length XL in the +X direction from the object rear end position of the second object OJ is the tape rear end position.

In the following description, when the center arrangement function is set, the object OJ that is a setting target of the center arrangement function, such as the first object OJ, is referred to as a "target object", and the object OJ that is not the setting target of the center arrangement function, such as the second object OJ, is referred to as a "non-target object". In other words, when the center arrangement function is set, the selected object OJ and the object OJ that is not selected but assigned in advance with the center arrangement attribute are referred to as the "target objects", and the object OJ that is not selected and not assigned with the center arrangement attribute is referred to as the "non-target object". It should be noted that a step of realizing the functions described above in the generation section 120 is an example of a "generation step".

Figure 6:
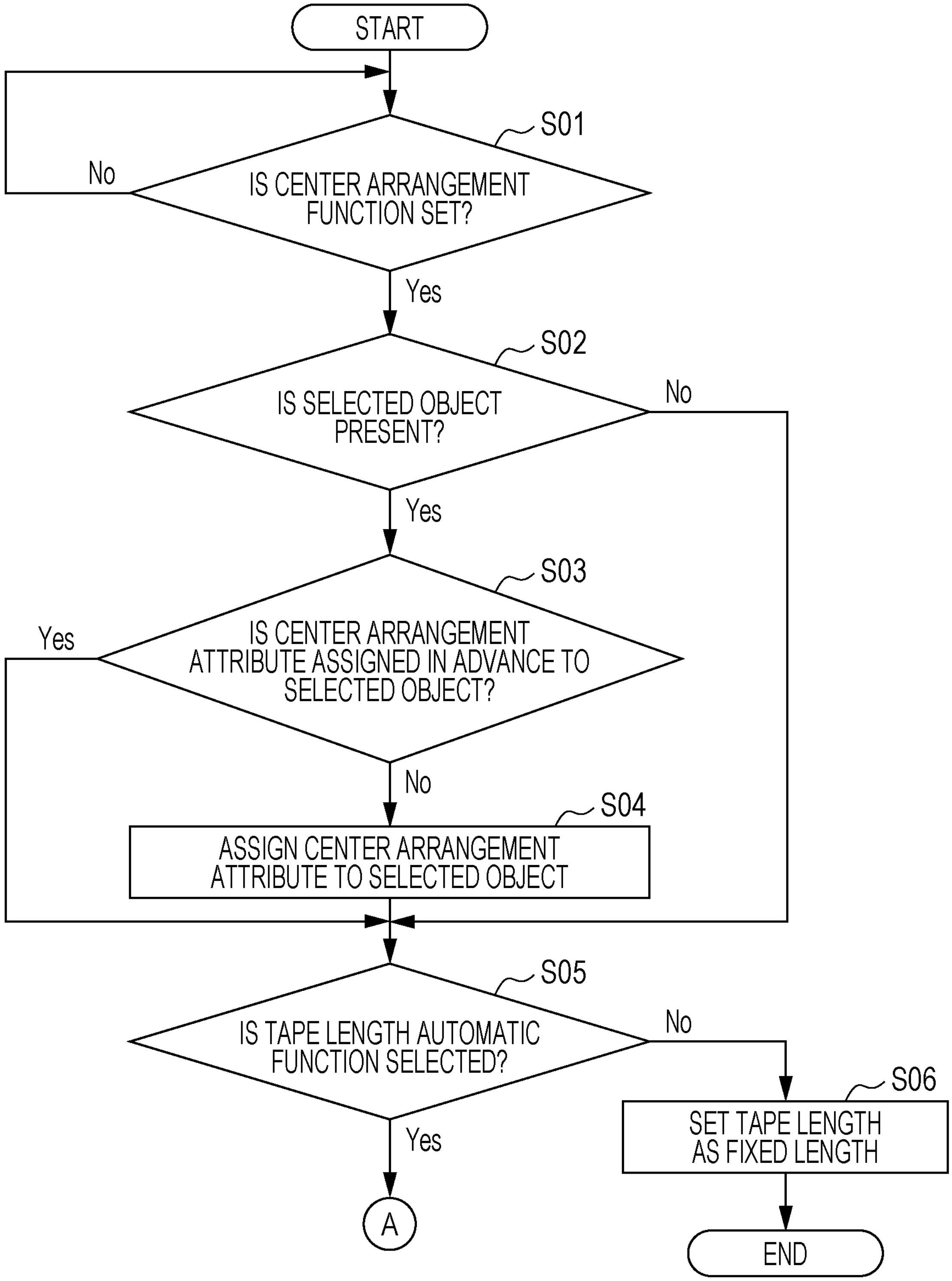
FIG. 6 is a flowchart illustrating a center arrangement process.

A tape length decision process executed by the PC 1 will be described with reference to FIGS. 6 and 7. The tape length decision process is an example of a "control method of a print data generation apparatus". The tape length decision process is started by using the function setting by the user as a trigger.

In step S01, the PC 1 determines whether or not the center arrangement function is set. When the PC 1 determines that the center arrangement function is set, the PC 1 proceeds to step S02. In addition, when the PC 1 determines that the center arrangement function is not set, the PC 1 repeats the determination in step S01.

In step S02, the PC 1 determines whether or not the selected object OJ is present. As illustrated in FIG. 8, when at least a part of an object image OI to which a selection mark 61 indicating the selection is added is included in an area of a print area image AI described later, the PC 1 determines that the selected object OJ is present. When the PC 1 determines that the selected object OJ is present, the PC 1 proceeds to step S03. In addition, when the PC 1 determines that the selected object OJ is not present, the PC 1 proceeds to step S05.

In step S03, the PC 1 determines whether or not the center arrangement attribute is assigned in advance to the selected object OJ. When the PC 1 determines that the center arrangement attribute is assigned in advance to the selected object OJ, the PC 1 proceeds to step S05. In addition, when the PC 1 determines that the center arrangement attribute is not assigned in advance to the selected object OJ, the PC 1 proceeds to step S04.

In step S04, the PC 1 assigns the center arrangement attribute to the selected object OJ.

In step S05, the PC 1 determines whether or not the tape length automatic function is selected as the editing setting of the object OJ. When the PC 1 determines that the tape length automatic function is selected, the PC 1 proceeds to step S06. In addition, when the PC 1 determines that the tape length automatic function is not selected, that is, when PC 1 determines that the tape length fixing function is selected, the PC 1 proceeds to step S07 of FIG. 7.

In step S06, the PC 1 sets the tape length as the fixed length. After step S06, the PC 1 terminates the tape length decision process.

Figure 7:
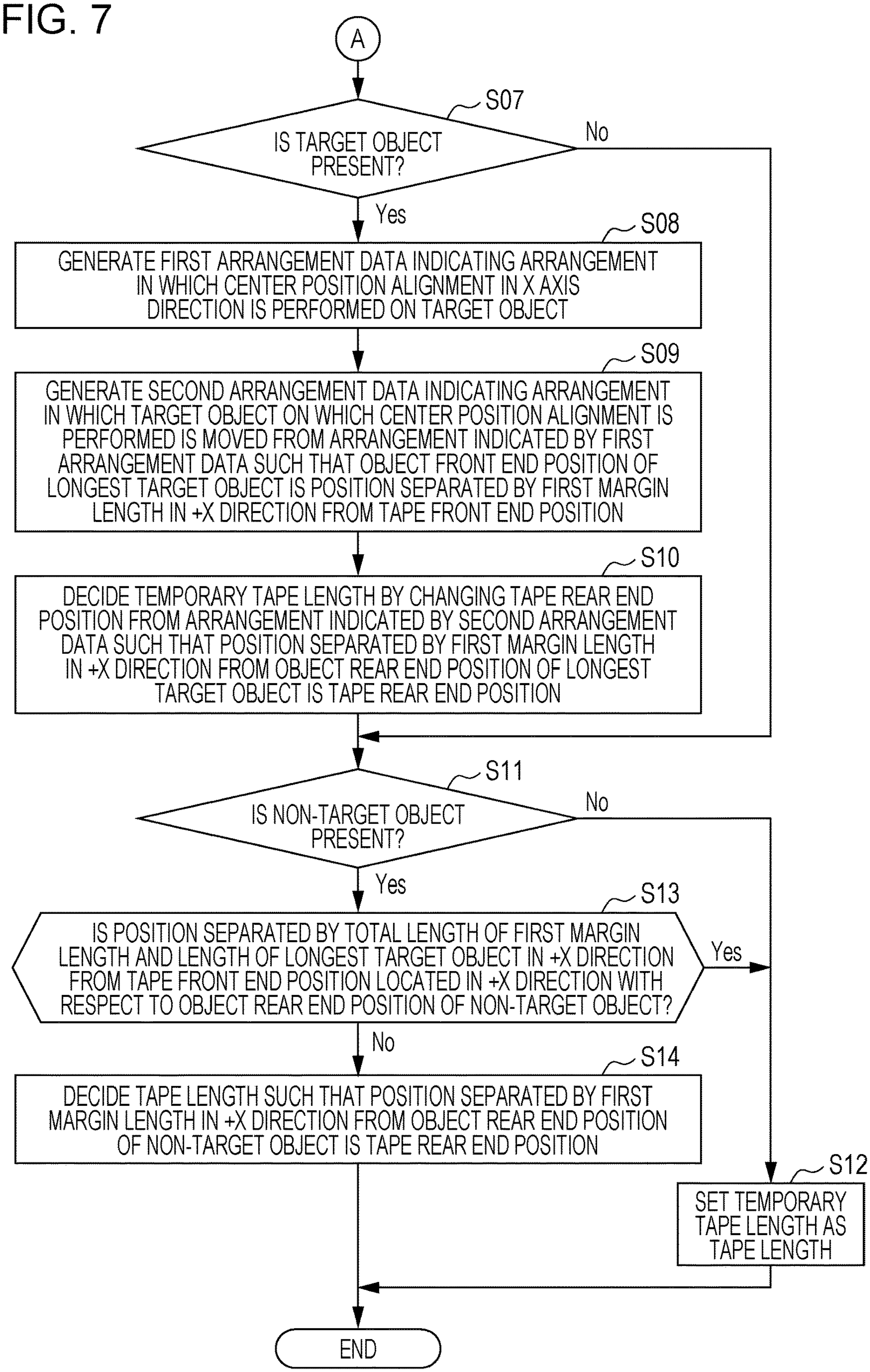
FIG. 7 is a flowchart illustrating a tape length decision process.

In step S07 of FIG. 7, the PC 1 determines whether or not the target object is present. Here, the PC 1 determines whether or not the object OJ to which the center arrangement attribute is assigned is present. As illustrated in FIG. 8, when at least a part of the object image OI of the target object is included in the area of the print area image AI described later, the PC 1 determines that the target object is present. When the PC 1 determines that the target object is present, the PC 1 proceeds to step S08. When the PC 1 determines that the target object is not present, the PC 1 proceeds to step S11.

Figure 11:
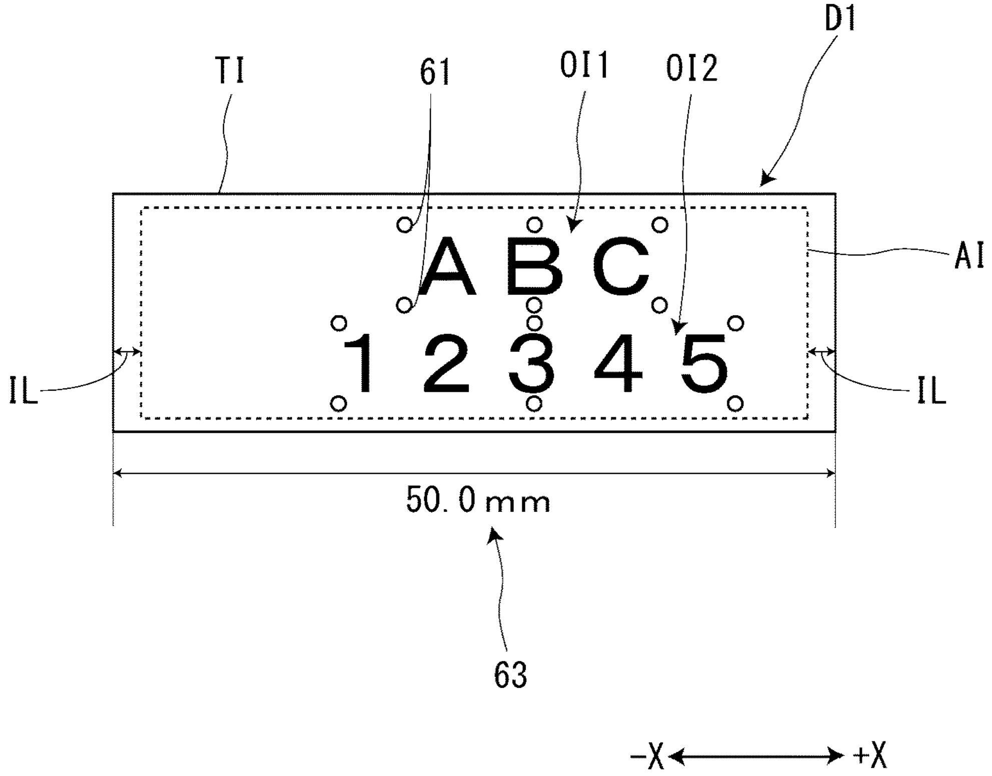
FIG. 11 is an explanatory diagram of first arrangement data.

In step S08, as illustrated in FIG. 11, the PC 1 generates first arrangement data D1 indicating the arrangement in which the center position alignment in the X axis direction is performed on the target object. When only one target object is present, the PC 1 generates the first arrangement data D1 without changing the position of the object OJ in the X axis direction. In addition, when a plurality of target objects are present, the PC 1 generates the first arrangement data D1 indicating the arrangement in which center position alignment in the X axis direction is performed on the plurality of objects OJ.

Figure 12:
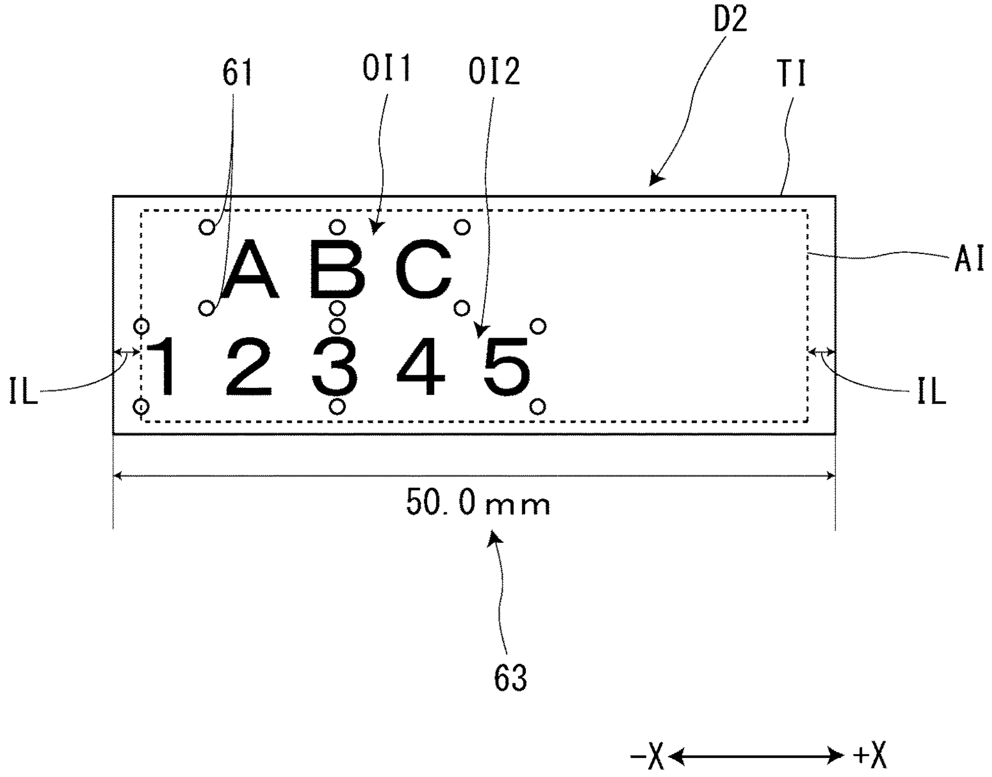
FIG. 12 is an explanatory diagram of second arrangement data.

In step S09, as illustrated in FIG. 12, the PC 1 generates second arrangement data D2 indicating the arrangement in which the target object on which the center position alignment is performed is moved from the arrangement indicated by the first arrangement data D1 such that the object front end position of the longest target object is a position separated by the first margin length XL in the +X direction from the tape front end position. The longest target object means a target object having a longest length in the X axis direction among the target objects printed on the tape T.

When only one target object is present, the PC 1 handles the target object as the longest target object.

In step S10, the PC 1 decides a temporary tape length by changing the tape rear end position from the arrangement indicated by the second arrangement data D2 such that a position separated by the first margin length XL in the +X direction from the object rear end position of the longest target object is the tape rear end position.

In step S11, the PC 1 determines whether or not the non-target object is present. Here, the PC 1 determines whether or not the object OJ to which the center arrangement attribute is not assigned is present. As illustrated in FIG. 8, when at least a part of the object image OI of the non-target object is included in the area of the print area image AI described later, the PC 1 determines that the non-target object is present. When the PC 1 determines that the non-target object is present, the PC 1 proceeds to step S13. When the PC 1 determines that the non-target object is not present, the PC 1 proceeds to step S12.

In step S12, the PC 1 sets the temporary tape length decided in step S10 as the tape length.

In step S13, the PC 1 determines whether or not a position separated by a total length of the first margin length XL and the length of the longest target object in the +X direction from the tape front end position is located in the +X direction with respect to the object rear end position of the non-target object. When a plurality of non-target objects are present, the PC 1 determines the object rear end position of the non-target object of which the object rear end position is located most in the +X direction among the plurality of non-target objects, as the object rear end position of the non-target object. When the PC 1 determines that a position separated by the total length of the first margin length XL and the length of the longest target object in the +X direction from the tape front end position is located in the +X direction with respect to the object rear end position of the non-target object, the PC 1 proceeds to step S12. In addition, when the PC 1 determines that a position separated by the total length of the first margin length XL and the length of the longest target object in the +X direction from the tape front end position is not located in the +X direction with respect to the object rear end position of the non-target object, the PC 1 proceeds to step S14.

In step S14, the PC 1 decides the tape length such that a position separated by the first margin length XL in the +X direction from the object rear end position of the non-target object is the tape rear end position.

With reference to FIGS. 8 to 16, a process when the center arrangement function is set will be described as a specific example. Before the specific example, the editing area 50 displayed on the PC-side display 11 will be described. As illustrated in FIG. 8, the print preview PP is displayed in the editing area 50. The print preview PP includes the tape image TI simulating the tape T, the object image OI simulating the object OJ, and the print area image AI indicating the print area A. The PC 1 displays the tape image TI having the tape width indicated by the cartridge information in the editing area 50 based on the cartridge information acquired from the tape printing apparatus 2. In addition, the PC 1 displays tape length information 63 indicating the tape length of the tape T to be created in the editing area 50.

As described above, since the print preview PP indicates the print result of the tape T, the tape image TI, the object image OI, and the print area image AI displayed in the editing area 50 correspond to the tape T, the object OJ, and the print area A, respectively. Therefore, in the description of the editing area 50, the direction is also indicated by using the X axis illustrated in FIG. 3.

In addition, in the X axis direction, a length between the front end position of the tape image TI and the front end position of the print area image AI, and a length between the rear end position of the tape image TI and the rear end position of the print area image AI correspond to the first margin length XL, and hereinafter referred to as a "margin image length IL".

In the example of FIG. 8, the PC 1 displays a first object image OI1 indicating characters of "ABC" and a second object image OI2 indicating numbers of "12345" on the tape image TI. In addition, in the example in FIG. 8, the PC 1 displays the first object image OI1 and the second object image OI2 by adding the selection mark 61 indicating the selected object OJ. The selection mark 61 is arranged to surround an object image area that is the area of the object image OI. In the example of FIG. 8, the PC 1 displays, as the selection mark 61, circular marks arranged at a total of six positions including four corner portions of a rectangular object image area and respective midpoints in the X axis direction of two sides parallel to the X axis direction of the rectangular object image area.

Figure 9:
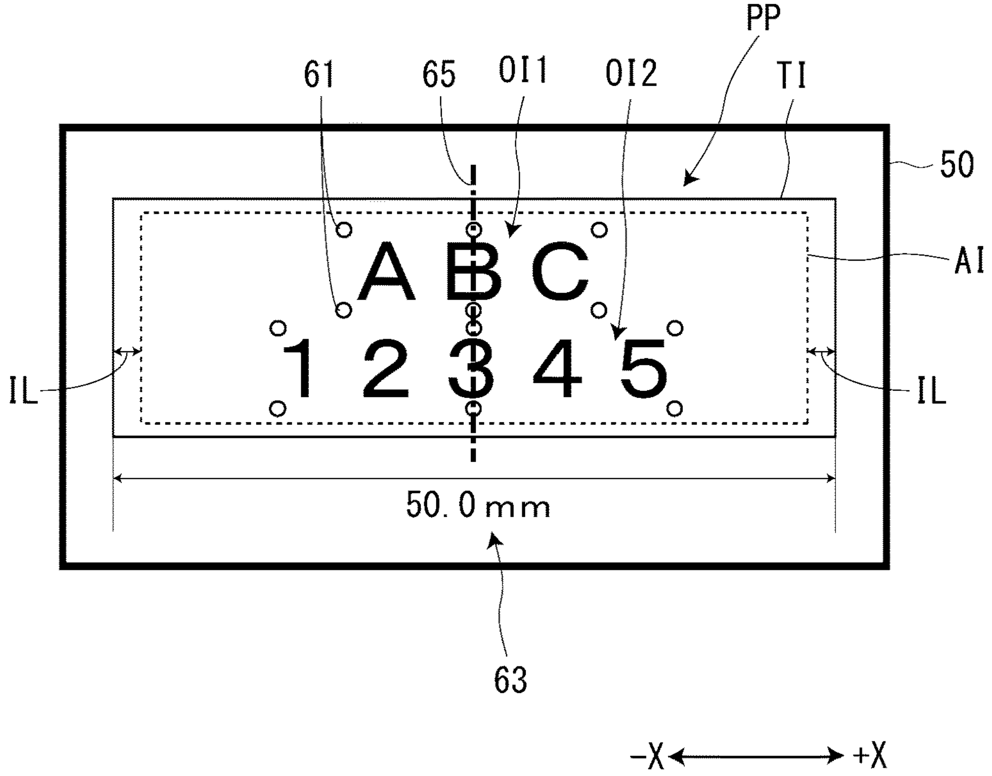
FIG. 9 is a diagram illustrating a display example of the editing area when a center arrangement function is set in the state illustrated in FIG. 8 when a tape length fixing function is selected.

Next, a process when the center arrangement function is set in a case in which the tape length fixing function is selected will be described. For example, when the center arrangement function is set in the state illustrated in FIG. 8 in a case in which the tape length fixing function in which "50.0 mm" is designated as the fixed length is selected, the PC 1 displays the editing area 50 illustrated in FIG. 9. That is, the PC 1 arranges the first object image OI1 and the second object image OI2 at the center of the tape image TI in the X axis direction without changing the tape length information 63. In FIG. 9, a center line 65 indicated by a one-dot chain line is a line indicating a center position of the tape image TI in the X axis direction. In this way, when the center arrangement function is set in a case in which the tape length fixing function is selected, the PC 1 arranges the object image OI at the center of the tape image TI in the X axis direction while maintaining the fixed length.

Next, a process when the center arrangement function is set in a case in which the tape length automatic function is selected will be described. Each of the examples illustrated below is the process when the center arrangement function is set in a case in which the tape length automatic function is selected.

Figure 10:
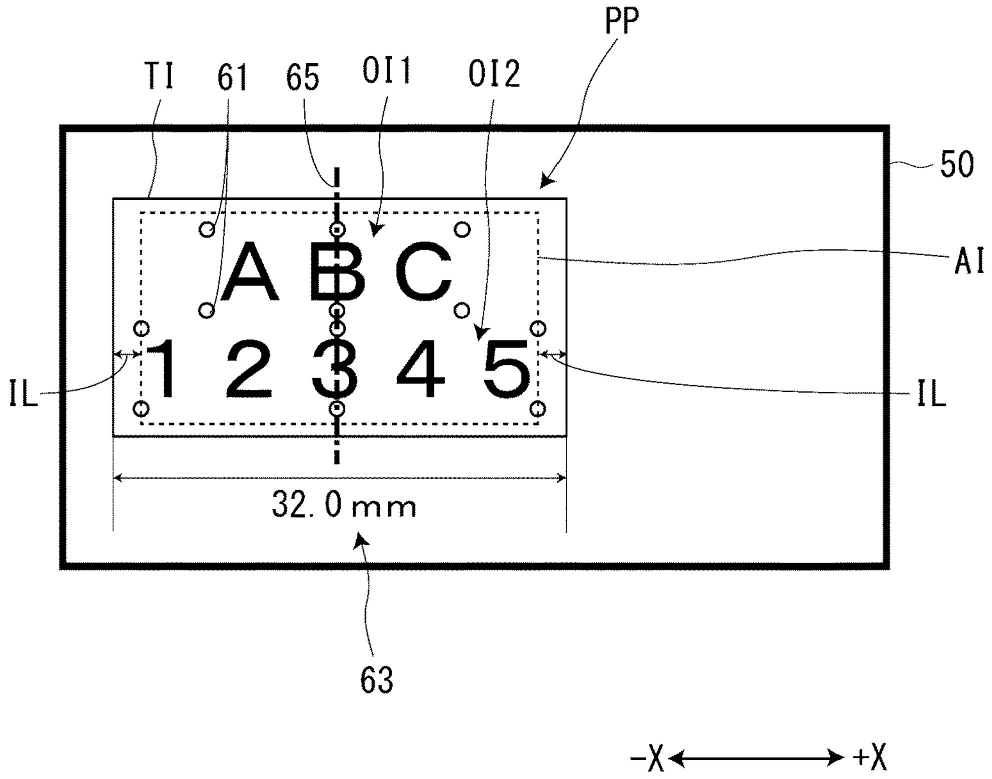
FIG. 10 is a diagram illustrating a display example of the editing area when the center arrangement function is set in the state illustrated in FIG. 8 when a tape length automatic function is selected.

When the center arrangement function is set in the state illustrated in FIG. 8 in a case in which the tape length automatic function is selected, the PC 1 displays the editing area 50 illustrated in FIG. 10. That is, the PC 1 changes the length of the tape image TI such that the front end position of the second object image OI2 (having a long length in the X axis direction out of the first object image OI1 and the second object image OI2) is the front end position of the print area image AI and the rear end position of the second object image OI2 is the rear end position of the print area image AI. For example, in the example of FIG. 10, the PC 1 changes the tape length from the tape length of "50.0 mm" illustrated in FIG. 8 to the tape length of "32.0 mm". In this way, when the center arrangement function is set in a case in which the tape length automatic function is selected, the PC 1 displays the print preview PP such that the object OJ is arranged at the center of the tape image TI in the X axis direction and the length of the tape image TI is as short as possible.

Incidentally, corresponding to steps S08 and S09 in FIG. 7, the PC 1 generates two arrange data illustrated in FIGS.

11 and 12 in a process of switching the display from the editing area 50 illustrated in FIG. 8 to the editing area 50 illustrated in FIG. 10. These arrangement data are generated in an internal process of the PC 1 and are not actually displayed in the editing area 50. The arrangement data includes, for example, coordinate data of the object image OI on the tape image TI. The coordinate data may indicate the coordinates of one corner portion that is one of the four corner portions of the object image area, which is a reference position, or may indicate the coordinates of all the four corner portions.

When the center arrangement function is set in the state illustrated in FIG. 8 in a case in which the tape length automatic function is selected, the PC 1 generates the first arrangement data D1 as illustrated in FIG. 11. As illustrated in FIG. 11, the first arrangement data D1 is data indicating the arrangement in which the center position alignment is performed on the center position of the first object image OI1 and the second object image OI2 on the tape image TI.

Next, the PC 1 generates the second arrangement data D2 based on the first arrangement data D1, as illustrated in FIG. 12. The second arrangement data D2 is data indicating the arrangement in which two object images OI on which the center position alignment is performed are moved such that the front end position of the second object image OI2 having a long length in the X axis direction among two object images OI is the front end position of the print area image AI.

Thereafter, the PC 1 displays the editing area 50 illustrated in FIG. 10, and decides the tape length based on the second arrangement data D2. That is, the PC 1 decides the length of the tape image TI, that is, the tape length by changing the rear end position of the tape image TI from the arrangement indicated by the second arrangement data D2 such that a position separated by the margin image length IL in the +X direction from the rear end position of the second object image OI2 is the rear end position of the tape image TI.

Figure 13:
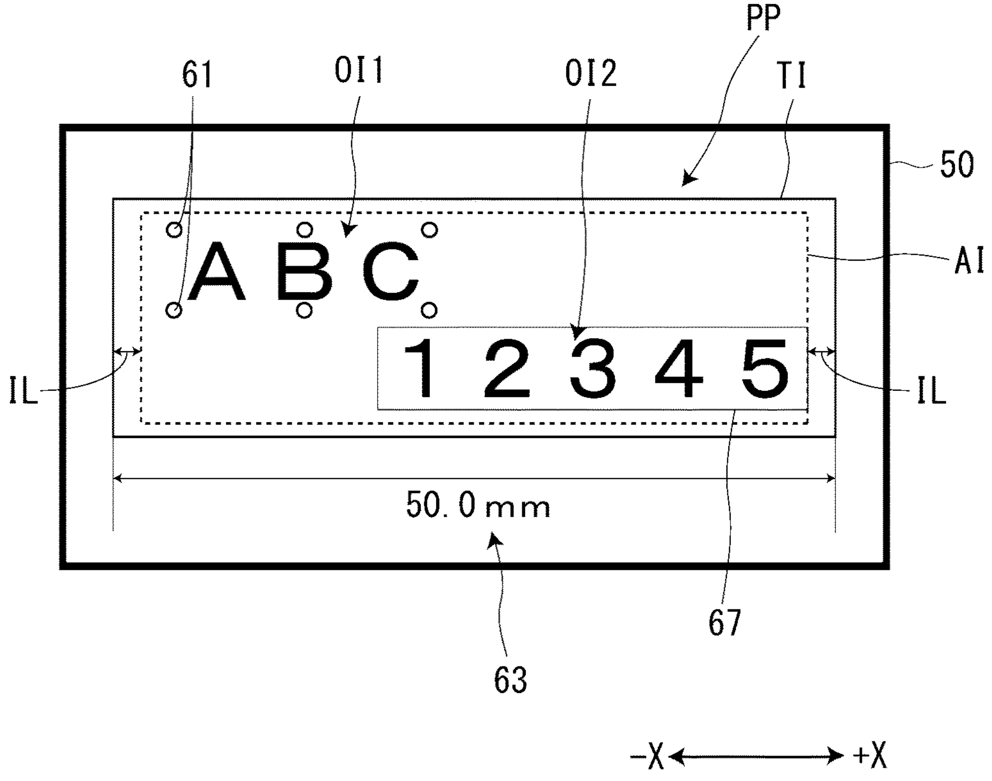
FIG. 13 is a diagram illustrating a display example of the editing area in which a first object image of a first object that is a target object and a second object image of a second object that is a non-target object are arranged on the tape image.
Figure 14:
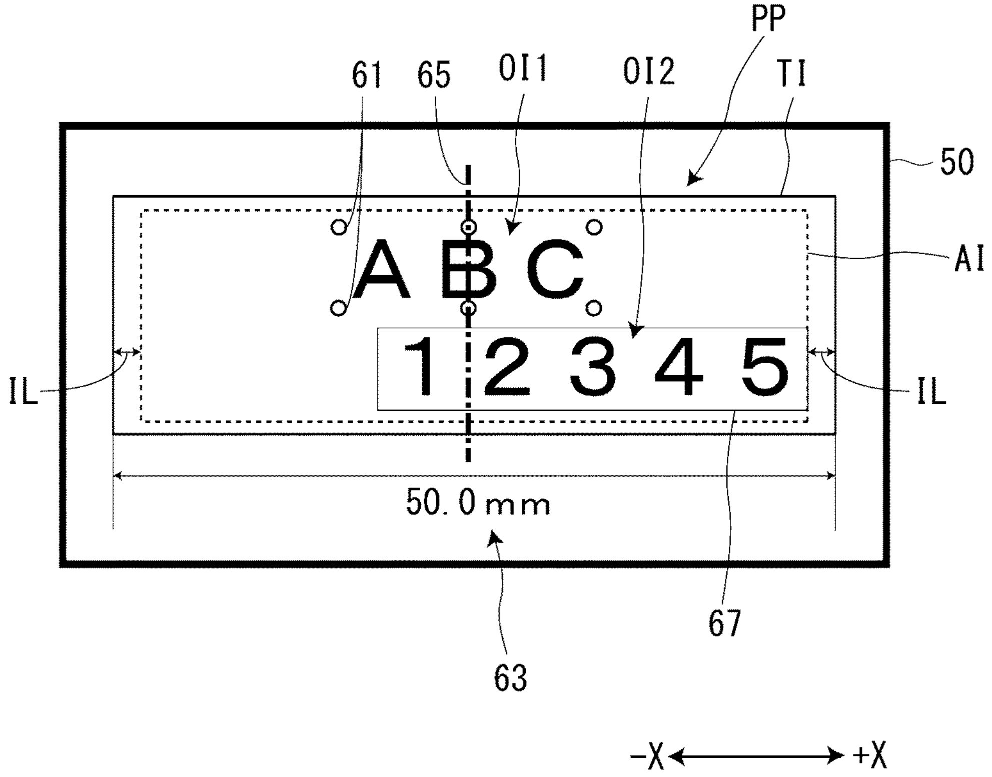
FIG. 14 is a diagram illustrating a display example of the editing area when the center arrangement function is set in the state illustrated in FIG. 13 when the tape length automatic function is selected.

Next, a process when the object image OI of the target object and the object image OI of the non-target object are arranged on the tape image TI will be described. FIGS. 13 and 14 are diagrams illustrating a first example in this case.

In the example of FIG. 13, the first object image OI1 to which the selection mark 61 is added is the object image OI of a first object OJ1 that is the target object when the center arrangement function is set. In addition, in the example of FIG. 13, the second object image OI2 to which the selection mark 61 is not added is the object image OI of a second object OJ2 that is the non-target object when the center arrangement function is set. It should be noted that, in the second object image OI2 to which the selection mark 61 is not added, an area frame 67 of the object image area is indicated by a thin line, but the thin line indicating the area frame 67 is not actually displayed in the editing area 50.

In the example of FIG. 13, the PC 1 decides the length of the tape image TI such that a position separated by the margin image length IL in the +X direction from the rear end position of the second object image OI2 is the rear end position of the tape image TI by the tape length automatic function. In the example of FIG. 13, a position separated by a total length of the margin image length IL and the length of the first object image OI1 in the X axis direction from the front end position of the tape image TI in the +X direction is located in the −X direction with respect to the rear end position of the second object image OI2.

The PC 1 displays the editing area 50 illustrated in FIG. 14 when the center arrangement function is set in the state illustrated in FIG. 13. In this case, the PC 1 decides the length of the tape image TI such that a position separated by the margin image length IL in the +X direction from the rear end position of the second object image OI2 is the rear end position of the tape image TI. In this case, since the position of the second object image OI2 with respect to the front end position of the tape image TI is not changed, the length of the tape image TI and the tape length information 63 are not changed.

Next, a second example of the process when the object image OI of the target object and the object image OI of the non-target object are arranged on the tape image TI will be described.

Figure 15:
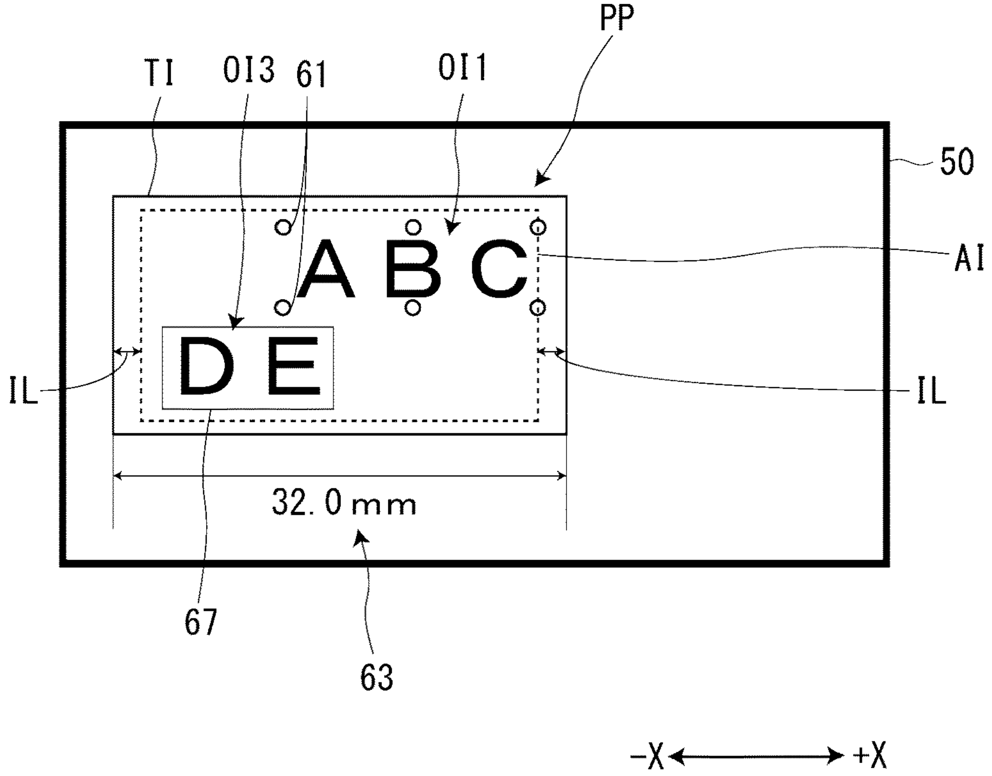
FIG. 15 is a diagram illustrating a display example of the editing area in which the first object image of the first object that is the target object and a third object image of a third object that is the non-target object are arranged on the tape image.

In the example of FIG. 15, the first object image OI1 to which the selection mark 61 is added is the object image OI of the first object OJ1 that is the target object when the center arrangement function is set. In addition, in the example of FIG. 15, a third object image OI3 to which the selection mark 61 is not added is the object image OI of a third object OJ3 that is the non-target object when the center arrangement function is set.

In addition, in the example of FIG. 15, the PC 1 decides the length of the tape image TI such that a position separated by the margin image length IL in the +X direction from the rear end position of the first object image OI1 is the rear end position of the tape image TI by the tape length automatic function. In the example of FIG. 15, a position separated by a total length of the margin image length IL and the length of the first object image OI1 in the X axis direction from the front end position of the tape image TI in the +X direction is located in the +X direction with respect to the rear end position of the third object image OI3.

Figures 16, 17:
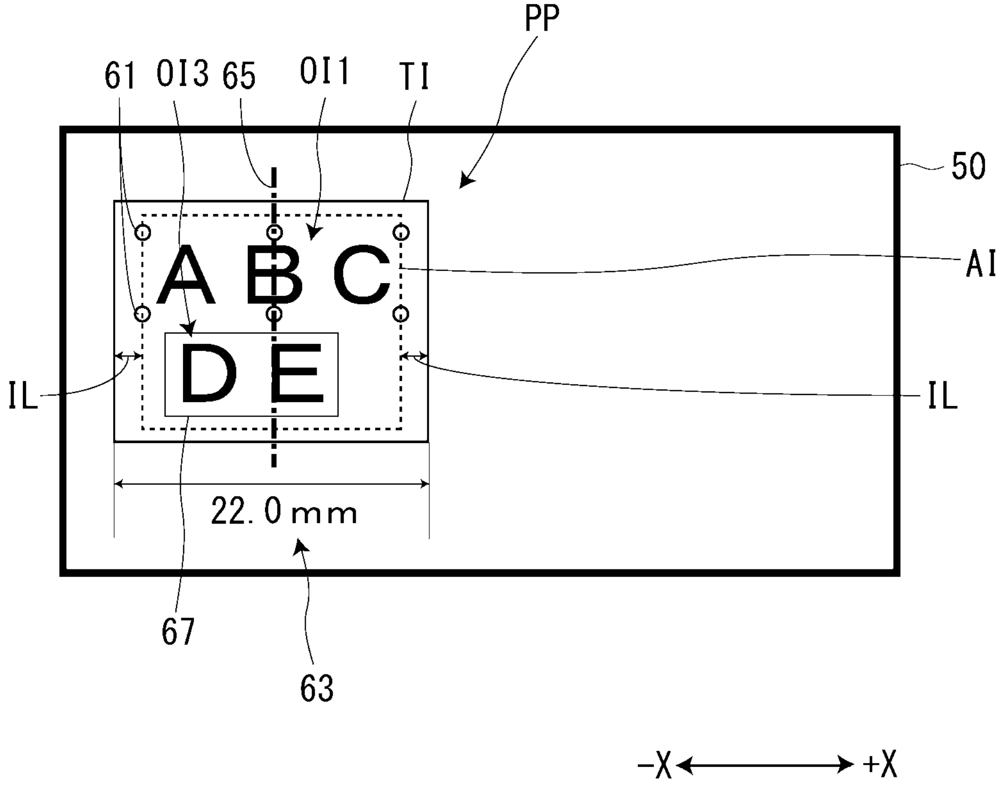
FIG. 16 is a diagram illustrating a display example of the editing area when the center arrangement function is set in the state illustrated in FIG. 15 when the tape length automatic function is selected.
FIG. 17 is a diagram illustrating an example of table data.

The PC 1 displays the editing area 50 illustrated in FIG. 16 when the center arrangement function is set in the state illustrated in FIG. 15. In this case, the PC 1 decides the length of the tape image TI such that a position separated by the margin image length IL in the +X direction from the rear end position of the first object image OI1 is the rear end position of the tape image TI. In the example of FIG. 16, since the first object image OI1 is moved in the −X direction such that the front end position of the first object image OI1 is the front end position of the print area image AI, the length of the tape image TI and the tape length indicated by the tape length information 63 are shorter than the length in the state illustrated in FIG. 15.

As described above, when the center arrangement function is set for the object OJ in a case in which the tape length automatic function is selected, the PC 1 according to the present embodiment decides the tape length such that a position separated by the first margin length XL in the −X direction from the object front end position that is the position of the end portion of the object OJ in the −X direction is the tape front end position and a position separated by the first margin length XL in the +X direction from the object rear end position is the tape rear end position. As a result, when the tape length automatic function is selected, the user can obtain the print result in which the object OJ is arranged with good appearance on the tape T and the tape consumption is reduced as much as possible.

In addition, since the PC 1 assigns the center arrangement attribute to the object OJ for which the center arrangement function is set, the setting management of the center arrangement function can be easily performed. In addition, when the specific operation, such as the movement or the size change, is performed on the object OJ to which the center arrangement attribute is assigned, the PC 1 cancels the center arrangement attribute, and thus an editing result unintended by the user can be suppressed.

In addition, when the object image OI of the target object and the object image OI of the non-target object are arranged on the tape image TI in a case in which the tape length automatic function is selected, the PC 1 decides the tape length as illustrated in FIGS. 13 to 16. In this way, when the object OJ that is the target of the center arrangement function and the object OJ that is not the target are printed on the tape T, the PC 1 can generate the print data that obtains the print result utilizing both functions and the arrangement of the object OJ for which the center arrangement function is not set.

Second Embodiment

A second embodiment of the present disclosure will be described. In the present embodiment, a case in which merge printing using table data 70 is performed will be described. In the present embodiment, the same components as components in the first embodiment are designated by the same reference numerals, and the detailed description thereof will be omitted.

The merge printing means that the table data 70 including a plurality of row data is acquired, and the plurality of objects OJ corresponding to the respective row data are printed on the tape T based on the acquired table data 70. The table data 70 is, for example, CSV data or data created by table calculation software. In addition, the row data is data included in one row of the table data 70. The user can efficiently perform the editing operation for continuously printing a large number of tapes T by creating the table data 70 in advance and performing the merge printing using the table data 70. In addition, by performing the merge printing, the user can cause the tape printing apparatus 2 to print the plurality of tapes T by only performing a print instruction operation once on the PC 1.

A hardware configuration of the PC 1 and the tape printing apparatus 2 according to the present embodiment is the same as the hardware configuration according to the first embodiment illustrated in FIG. 4. In addition, a functional configuration of the PC 1 according to the present embodiment is the same as the functional configuration according to the first embodiment illustrated in FIG. 5. However, in the present embodiment, the generation section 120 acquires the table data 70, and generates the print data based on the plurality of row data included in the acquired table data 70 such that the plurality of objects OJ corresponding to the respective row data are printed. In addition, when the center arrangement function is set for the object OJ corresponding to any one of the row data included in the table data 70, the generation section 120 generates the print data assuming that the center arrangement function is also set for the object OJ corresponding another row data included in the table data 70.

FIG. 17 is a diagram illustrating an example of the table data 70. The table data 70 illustrated in FIG. 17 includes row data for two rows. In addition, each row data includes data for two columns. Therefore, when the PC 1 acquires the table data 70 illustrated in FIG. 17, the PC 1 can arrange two object images OI corresponding to the respective columns with respect to one tape image TI. In this way, the PC 1 can merge the data for the number of columns included in the row data when the merge printing is performed. Alternatively, the PC 1 can merge the data for one or more selection columns selected by the user among the plurality of columns included in the table data 70.

It should be noted that, in the following description, the object OJ and the object image OI corresponding to cell data of row 1, column A of the table data 70 are referred to as the first object OJ1 and the first object image OI1. In addition, the object OJ and the object image OI corresponding to cell data of row 1, column B of the table data 70 are referred to as the second object OJ2 and the second object image OI2. In addition, the object OJ and the object image OI corresponding to cell data of row 2, column A of the table data 70 are referred to as the third object OJ3 and the third object image OI3. In addition, the object OJ and the object image OI corresponding to cell data of row 2, column B of the table data 70 are referred to as a fourth object OJ4 and a fourth object image OI4.

Figure 18:
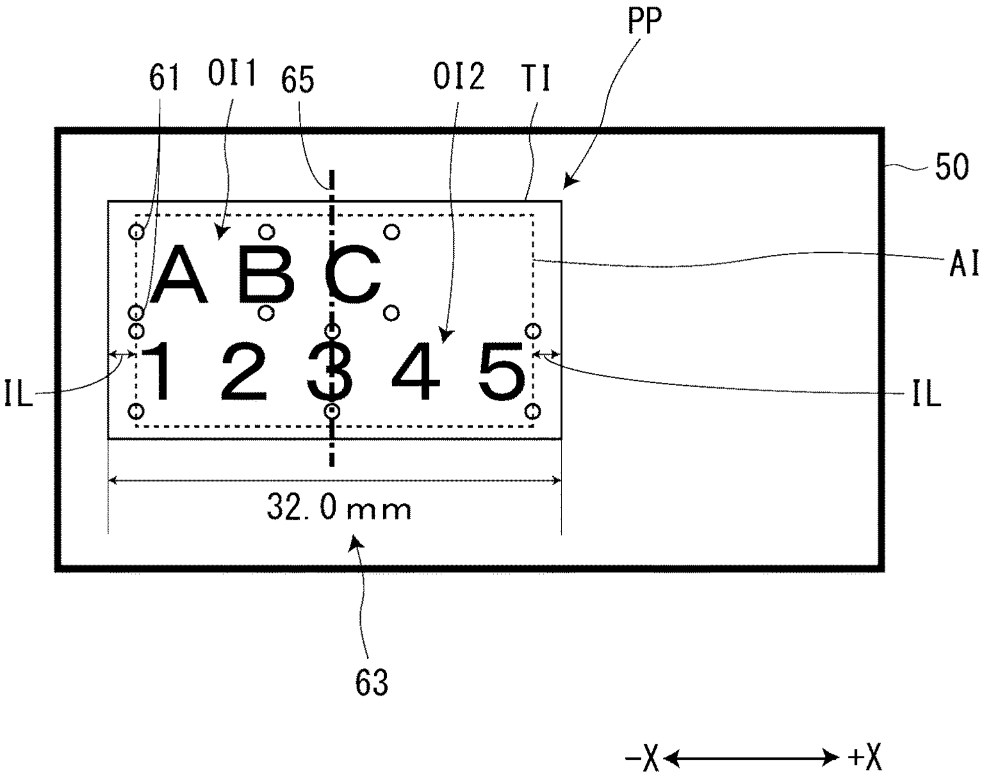
FIG. 18 is a diagram illustrating a display example of the editing area when row data of row 1 of the table data of FIG. 17 is merged when the tape length automatic function is selected.

FIG. 18 is a diagram illustrating a display example of the editing area 50 when the row data of row 1 of the table data 70 of FIG. 17 is merged in a case in which the tape length automatic function is selected. Since the example of FIG. 18 illustrates a state before the center arrangement function is set, both the front end position of the first object image OI1 and the front end position of the second object image OI2 are located at the front end position of the print area image AI. In the example of FIG. 18, the length of the tape image TI is decided such that a position separated by the margin image length IL in the +X direction from the rear end position of the second object image OI2 having a long length in the X axis direction out of the first object image OI1 and the second object image OI2 is the rear end position of the tape image TI by the tape length automatic function.

Figure 19:
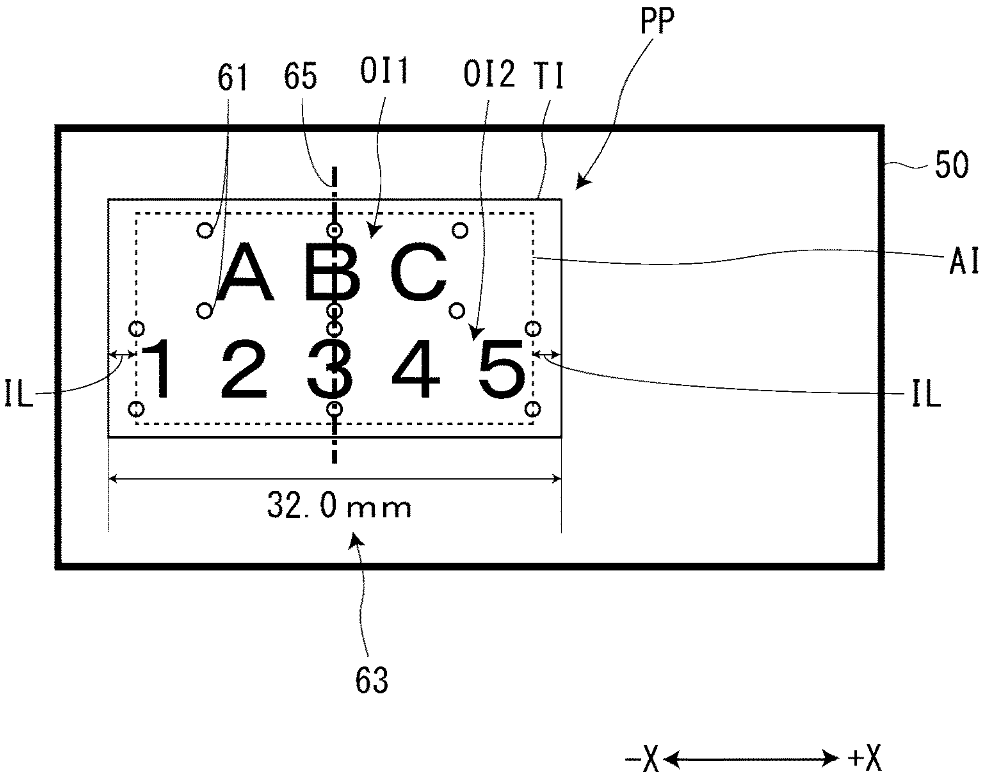
FIG. 19 is a diagram illustrating a display example of the editing area when the center arrangement function is set in the state of FIG. 18.

The PC 1 displays the editing area 50 illustrated in FIG. 19 when the center arrangement function is set in the state illustrated in FIG. 18. In this case, the PC 1 performs the center position alignment in the X axis direction on the two object images OI. In addition, the PC 1 changes the length of the tape image TI such that a position separated by the margin image length IL in the −X direction from the front end position of the second object image OI2 having a long length in the X axis direction among the two object images OI on which the center position alignment is performed is the front end position of the tape image TI and a position separated by the margin image length IL in the +X direction from the rear end position of the second object image OI2 is the rear end position of the tape image TI.

It should be noted that, when the center arrangement function is set and the center arrangement attribute is assigned to the object OJ corresponding to any cell data in the merge printing, the PC 1 handles the object OJ corresponding to the cell data of another row belonging to the same row as the column as the any cell data assuming the center arrangement attribute is also assigned thereto. For example, when the center arrangement function is set for the first object OJ1 corresponding to the cell data of row 1, column A, the third object OJ3 corresponding to the cell data of row 2, column A is handled assuming that the center arrangement attribute is also assigned thereto.

Figure 20:
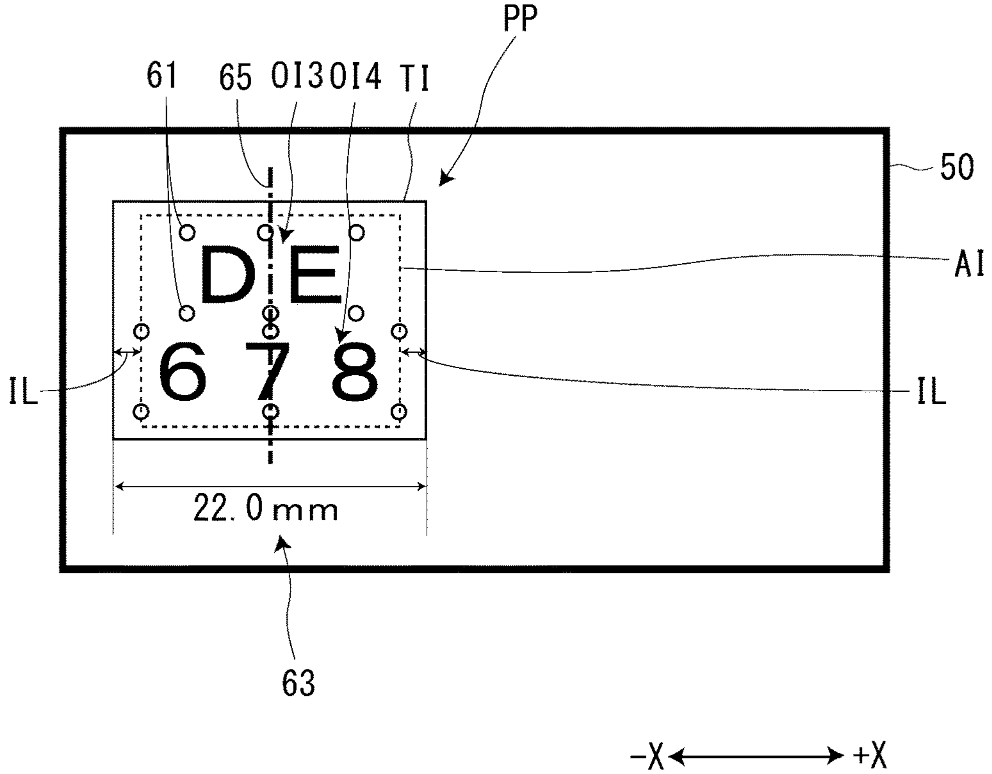
FIG. 20 is a diagram illustrating a display example of the editing area when row data of row 2 of the table data of FIG. 17 is merged after FIG. 19.

FIG. 20 is a diagram illustrating a display example of the editing area 50 when the row data of row 2 of the table data 70 of FIG. 17 is merged after FIG. 19. In the example of FIG. 19, since the center arrangement function is set for the first object OJ1 and the second object OJ2, the PC 1 displays the third object OJ3 and the fourth object OJ4 assuming that the center arrangement attribute is also assigned thereto. That is, the PC 1 performs the center position alignment in the X axis direction on the third object image OI3 and the fourth object image OI4. In addition, the PC 1 sets a position separated by the margin image length IL in the −X direction from the front end position of the fourth object image OI4 having a long length in the X axis direction among the two object images OI on which the center position alignment is performed as the front end position of the tape image TI. In addition, the PC 1 changes the length of the tape image TI such that a position separated by the margin image length IL in the +X direction from the rear end position of the fourth object image OI4 is the rear end position of the tape image TI. In this way, the PC 1 changes the length of the tape image TI based on the merged row data when the merge printing is performed in a case in which the tape length automatic function is selected and the center arrangement function is set.

Figure 21:
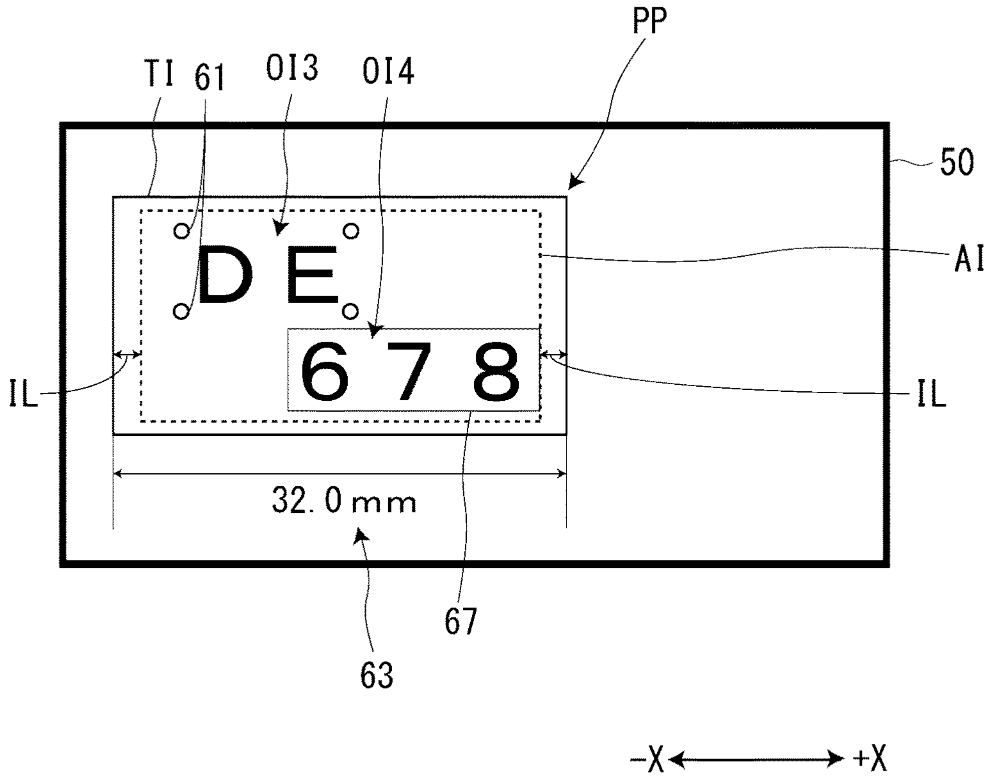
FIG. 21 is a diagram illustrating a display example of the editing area when a fourth object image is moved in a +X direction in the state of FIG. 20.

Next, a process when the merge printing is performed and the specific operation is performed on the merged object OJ will be described. FIG. 21 is a diagram illustrating a display example of the editing area 50 when the fourth object image OI4 is moved in the +X direction in the state of FIG. 20. In this case, since the tape length automatic function is selected as the editing setting of the object OJ, the PC 1 decides the length of the tape image TI such that a position separated by the margin image length IL in the +X direction from the rear end position of the fourth object image OI4 is the rear end position of the tape image TI. In addition, since the specific operation is performed on the fourth object OJ4, the PC 1 cancels the center arrangement attribute of the fourth object OJ4. In addition, the PC 1 handles the second object OJ2 having the same corresponding column as the fourth object OJ4 assuming that the center arrangement attribute is not assigned thereto.

Figure 22:
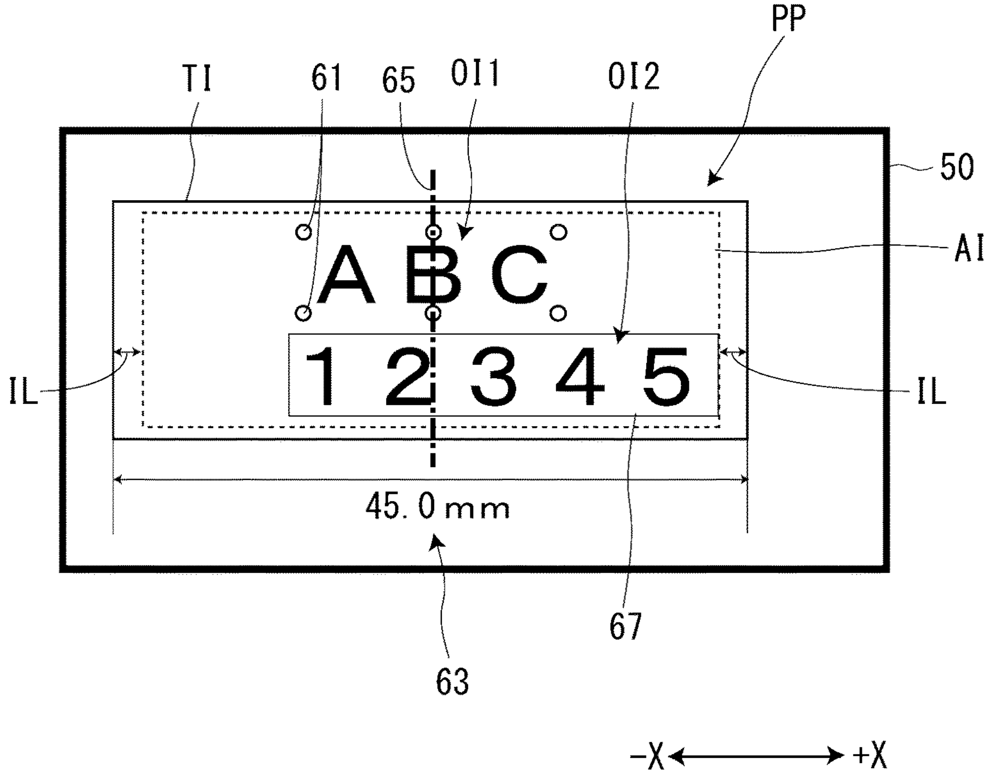
FIG. 22 is a diagram illustrating a display example of the editing area when the row data of row 1 of the table data of FIG. 17 is merged after FIG. 21.

FIG. 22 is a diagram illustrating a display example of the editing area 50 when the row data of row 1 of the table data 70 of FIG. 17 is merged after FIG. 21. In this case, since the PC 1 handles the second object OJ2 assuming that the center arrangement attribute is not assigned, the PC 1 sets the front end position of the second object image OI2 as the front end position of the fourth object image OI4 in FIG. 21 in the X axis direction. In the example of FIG. 22, a position separated by a total length of the margin image length IL and the length of the first object image OI1 in the X axis direction from the front end position of the tape image TI in the +X direction is located in the −X direction with respect to the rear end position of the second object image OI2. In this case, the PC 1 decides the length of the tape image TI such that a position separated by the margin image length IL in the +X direction from the rear end position of the second object image OI2 is the rear end position of the tape image TI.

Figure 23:
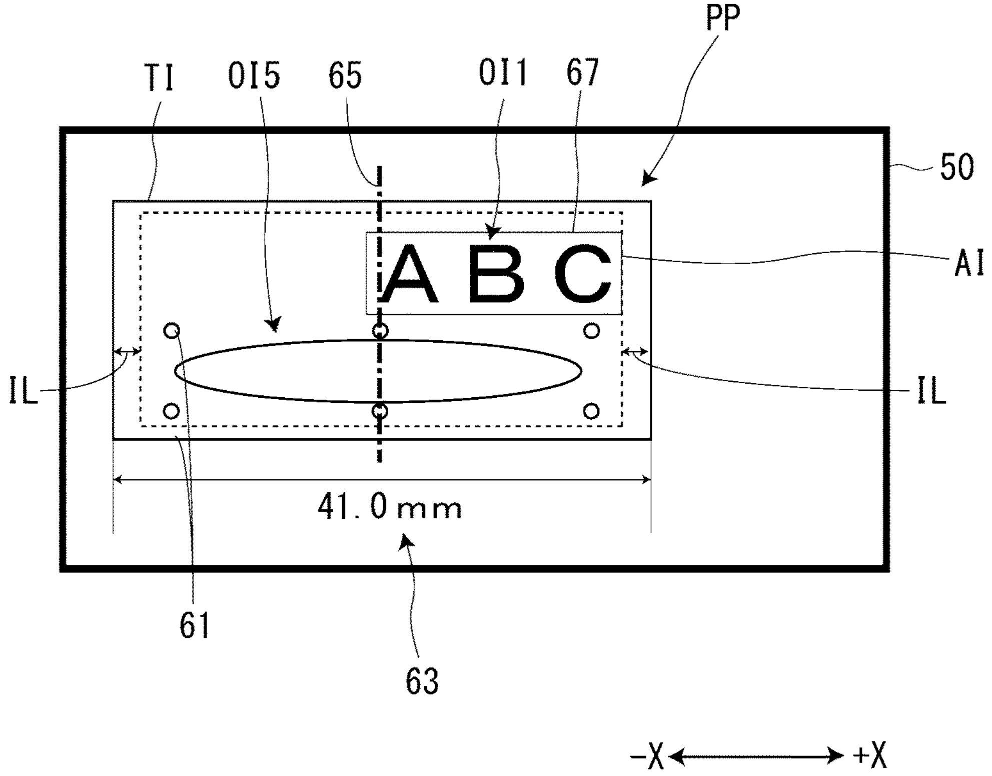
FIG. 23 is a diagram illustrating a display example of the editing area in which the first object image of the first object that corresponds to cell data of row 1, column A of the table data of FIG. 17 and is the non-target object and a fifth object image of a fifth object that is the target object are arranged on the tape image.

Next, a process when the object OJ that is the target of merge printing is the non-target object and the object OJ that is not the target of the merge printing is the target object will be described. FIG. 23 is a diagram illustrating a display example of the editing area 50 in which the first object image OI1 of the first object OJ1 that corresponds to the cell data of row 1, column A of the table data 70 of FIG. 17 and is the non-target object and a fifth object image OI5 of a fifth object OJ5 that is the target object are arranged on the tape image TI.

In the example of FIG. 23, the center arrangement attribute is not assigned to the first object OJ1 corresponding to the cell data of row 1, column A of the table data 70. In addition, in the example of FIG. 23, the fifth object OJ5 is an elliptical figure. In addition, in the example of FIG. 23, the PC 1 decides the length of the tape image TI such that a position separated by the margin image length IL in the +X direction from the rear end position of the first object image OI1 is the rear end position of the tape image TI by the tape length automatic function. In addition, in the example of FIG. 23, the PC 1 arranges the fifth object image OI5 at the center of the tape image TI by setting the center arrangement function.

Figure 24:
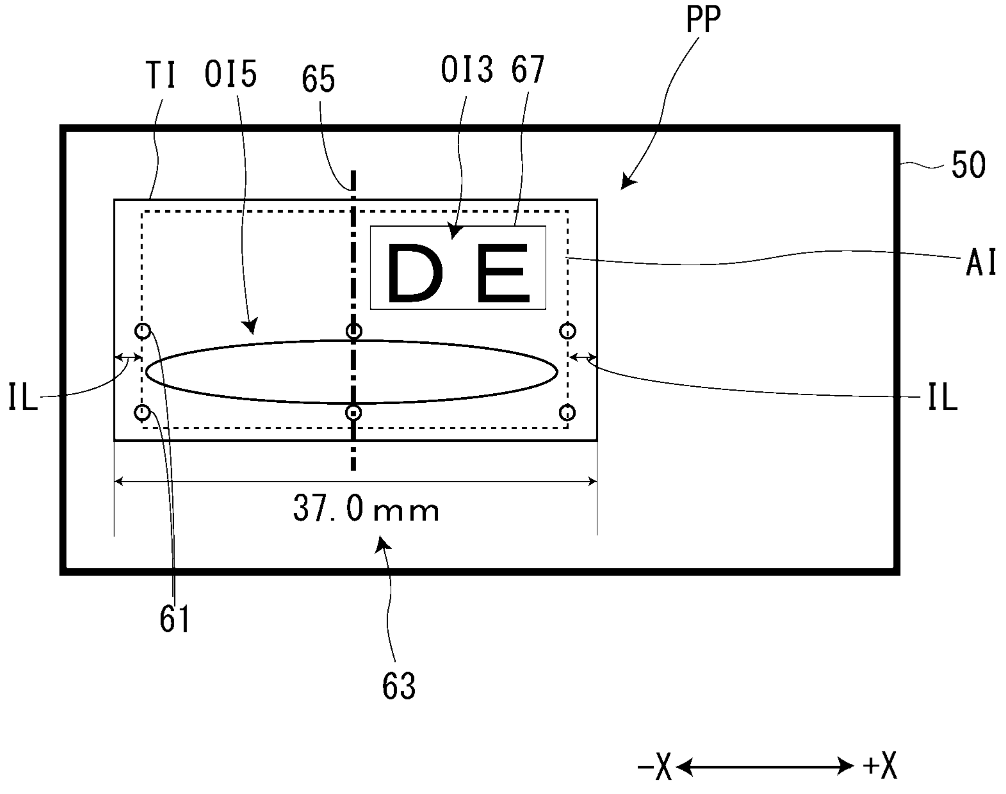
FIG. 24 is a diagram illustrating a display example of the editing area when cell data of row 2, column A of the table data is merged after FIG. 23.

FIG. 24 is a diagram illustrating a display example of the editing area 50 when cell data of row 2, column A of the table data 70 is merged after FIG. 23. In this case, since the center arrangement attribute is not assigned to the third object OJ3 corresponding to the cell data of the same column A as the first object OJ1, the PC 1 sets the front end position of the third object image OI3 as the front end position of the first object image OI1 in FIG. 23 in the X axis direction. In the example of FIG. 24, a position separated by a total length of the margin image length IL and the length of the fifth object image OI5 to which the center arrangement attribute is assigned in the X axis direction from the front end position of the tape image TI in the +X direction is located in the +X direction with respect to the rear end position of the third object image OI3. In this case, the PC 1 decides the length of the tape image TI such that a position separated by the margin image length IL in the +X direction from the rear end position of the fifth object image OI5 is the rear end position of the tape image TI.

In this way, the PC 1 changes the length of the tape image TI based on the merged row data even when the object OJ that is the target of the merge printing is the non-target object. Further, the PC 1 also changes the arrangement of the object OJ for which the center arrangement function is set on the tape image TI.

As described above, even in the merge printing, when the center arrangement function is set in a case in which the tape length automatic function is selected, the PC 1 according to the second embodiment can generate the print data that obtains the print result utilizing both functions.

Two embodiments are described above, but the following modification examples can be adopted instead of these embodiments.

Modification Example 1

In the embodiments described above, a case in which tape landscape orientation is selected as the editing setting of the object OJ, that is, a case in which the character object OJ is horizontally written is described, but the embodiments described above can be applied even when tape portrait orientation is selected, that is a case in which the character object OJ is vertically written.

It should be noted that, when the editing setting of the object OJ is changed from the tape landscape orientation to the tape portrait orientation, it is preferable that the PC 1 cancels the center arrangement attribute for all of the objects OJ being edited in the editing area 50. In this case, the operation of changing the editing setting between the tape landscape orientation and the tape portrait orientation is an example of a "specific operation".

Modification Example 2

The embodiments described above may be applied to the tape printing apparatus 2. That is, the tape printing apparatus 2 may realize each of the functions illustrated in FIG. 5. In the present modification example, each of the functions illustrated in FIG. 5 is realized by the printing apparatus-side CPU 44*a* executing the control program stored in the printing apparatus-side ROM 44*b*.

Modification Example 3

The "print data generation apparatus" may be an information processing terminal, such as a smartphone, instead of the PC 1. In addition, the tape printing application 30 may be provided to a customer as a program. In addition, a storage medium on which the tape printing application 30 is recorded may be provided to the customer. Other configurations can be appropriately changed without departing from the gist of the present disclosure.

Additional Note

Hereinafter, the print data generation apparatus, the control method of the print data generation apparatus, and the non-transitory computer-readable storage medium storing the program will be additionally noted.

A PC 1 generates print data for causing a tape printing apparatus 2 to print an object OJ on a tape T fed in a first direction, the PC 1 including a reception section 110 that receives selection of any one of a tape length fixing function of deciding a tape length to be a fixed length designated by a user and a tape length automatic function of deciding the tape length by setting, as a tape rear end position, a position separated by a first margin length XL in a second direction opposite to the first direction from an object rear end position, which is a position of an end portion of the object OJ in the second direction, and setting, for the object OJ, of a center arrangement function of arranging the object OJ at a center of the tape T in the first direction, and a generation section 120 that generates the print data, in which the generation section 120 arranges, when the center arrangement function is set for the object OJ in a case in which the tape length fixing function is selected, the object OJ for which the center arrangement function is set at the center of the tape T in the first direction while maintaining the fixed length, and decides, when the center arrangement function is set for the object OJ in a case in which the tape length automatic function is selected, the tape length such that a position separated by the first margin length XL in the first direction from an object front end position, which is a position of an end portion of the object OJ for which the center arrangement function is set in the first direction, is a tape front end position and a position separated by the first margin length XL in the second direction from the object rear end position of the object OJ for which the center arrangement function is set is the tape rear end position, to generate the print data such that the object OJ for which the center arrangement function is set is arranged at the center of the tape T in the first direction.

A control method of a PC 1 that generates print data for causing a tape printing apparatus 2 to print an object OJ on a tape T fed in a first direction includes causing the PC 1 to execute a reception step of receiving selection of any one of a tape length fixing function of deciding a tape length to be a fixed length designated by a user and a tape length automatic function of deciding the tape length by setting, as a tape rear end position, a position separated by a first margin length XL in a second direction opposite to the first direction from an object rear end position, which is a position of an end portion of the object OJ in the second direction, and setting, for the object OJ, of a center arrangement function of arranging the object OJ at a center of the tape T in the first direction, and a generation step of generating the print data, in which in the generation step, when the center arrangement function is set for the object OJ in a case in which the tape length fixing function is selected, the object OJ for which the center arrangement function is set is arranged at the center of the tape T in the first direction while maintaining the fixed length, and when the center arrangement function is set for the object OJ in a case in which the tape length automatic function is selected, the tape length is decided such that a position separated by the first margin length XL in the first direction from an object front end position, which is a position of an end portion of the object OJ for which the center arrangement function is set in the first direction, is a tape front end position and a position separated by the first margin length XL in the second direction from the object rear end position of the object OJ for which the center arrangement function is set is the tape rear end position, to generate the print data such that the object OJ for which the center arrangement function is set is arranged at the center of the tape T in the first direction.

A tape printing application 30 is a program causing the PC 1 that generates print data for causing a tape printing apparatus 2 to print an object OJ on a tape T fed in a first direction, to execute a reception step of receiving selection of any one of a tape length fixing function of deciding a tape length to be a fixed length designated by a user and a tape length automatic function of deciding the tape length by setting, as a tape rear end position, a position separated by a first margin length XL in a second direction opposite to the first direction from an object rear end position, which is a position of an end portion of the object OJ in the second direction, and setting, for the object OJ, of a center arrangement function of arranging the object OJ at a center of the tape T in the first direction, and a generation step of generating the print data, in which in the generation step, when the center arrangement function is set for the object OJ in a case in which the tape length fixing function is selected, the object OJ for which the center arrangement function is set is arranged at the center of the tape T in the first direction while maintaining the fixed length, and when the center arrangement function is set for the object OJ in a case in which the tape length automatic function is selected, the tape length is decided such that a position separated by the first margin length XL in the first direction from an object front end position, which is a position of an end portion of the object OJ for which the center arrangement function is set in the first direction, is a tape front end position and a position separated by the first margin length XL in the second direction from the object rear end position of the object OJ for which the center arrangement function is set is the tape rear end position, to generate the print data such that the object OJ for which the center arrangement function is set is arranged at the center of the tape T in the first direction.

With this configuration, when the center arrangement function is set for the object OJ in a case in which the tape length automatic function is selected, the PC 1 can generate the print data that obtains the print result utilizing both functions. As a result, when the tape length automatic function is selected, the user can obtain the print result in which the object OJ is arranged with good appearance on the tape T and the tape consumption is reduced as much as possible.

It is preferable that, in the PC 1 described above, when the center arrangement function is set for a plurality of the objects OJ in a case in which the tape length automatic function is selected, the generation section 120 performs center position alignment in the first direction on the plurality of objects OJ for which the center arrangement function is set, and decides the tape length such that a position separated by the first margin length XL in the first direction from the object front end position of a longest object, which is the object OJ having a longest length in the first direction among the plurality of objects OJ for which the center arrangement function is set is the tape front end position and a position separated by the first margin length XL in the second direction from the object rear end position of the longest object is the tape rear end position.

With this configuration, even when the center arrangement function is set for the plurality of objects OJ in a case in which the tape length automatic function is selected, the PC 1 can generate the print data that obtains the print result utilizing both functions.

It is preferable that, in the PC 1 described above, when the center arrangement function is set for the plurality of objects OJ for which the center arrangement function is set in a case in which the tape length automatic function is selected, the generation section 120 generates first arrangement data D1 indicating arrangement in which the center position alignment in the first direction is performed on the plurality of objects OJ on the tape T, generates second arrangement data D2 indicating arrangement in which the plurality of objects OJ on which the center position alignment is performed are moved from the arrangement indicated by the first arrangement data D1 such that the object front end position of the longest object is a position separated by the first margin length XL in the second direction from the tape front end position, and decides the tape length by changing the tape rear end position from the arrangement indicated by the second arrangement data D2 such that the position separated by the first margin length XL in the second direction from the object rear end position of the longest object is the tape rear end position.

With this configuration, even when the center arrangement function is set for the plurality of objects OJ arranged on the tape T in a case in which the tape length automatic function is selected, the PC 1 can generate the print data that obtains the print result utilizing both functions by reliable steps.

It is preferable that, in the PC 1 described above, the generation section 120 acquires table data 70 and generates, based on a plurality of row data included in the acquired table data 70, the print data such that a plurality of the objects OJ corresponding to the respective row data are printed, and generates, when the center arrangement function is set for the object OJ corresponding to any one of the row data included in the table data 70, the print data assuming that the center arrangement function is also set for the object OJ corresponding to another row data included in the table data 70.

With this configuration, even in the merge printing, when the center arrangement function is set in a case in which the tape length automatic function is selected, the PC 1 can generate the print data that obtains the print result utilizing both functions.

It is preferable that, in the PC 1 described above, the generation section 120 assigns, when the center arrangement function is set in a state in which the object OJ is selected, and a center arrangement attribute is not assigned to the selected object OJ, the center arrangement attribute to the selected object OJ, and arranges, when the center arrangement function is set, the selected object OJ and the object OJ which is not selected but assigned in advance with the center arrangement attribute at the center of the tape T in the first direction.

With this configuration, the PC 1 can easily perform the setting management of the center arrangement function by using the center arrangement attribute.

It is preferable that, in the PC 1 described above, when a specific operation including at least one of movement and size change is performed on the object OJ assigned with the center arrangement attribute, the generation section 120 cancels the center arrangement attribute.

With this configuration, when the movement or the size change is performed on the object OJ to which the center arrangement attribute is assigned, the PC 1 cancels the center arrangement attribute, and thus an editing result unintended by the user can be suppressed.

It is preferable that, in the PC 1 described above, the generation section 120 does not change, when the center arrangement function is set for a first object OJ and the center arrangement function is not set for a second object OJ when the tape length automatic function is selected, a position of the second object OJ with respect to the tape front end position, and decides the tape length such that a position separated by the first margin length XL in the second direction from the object rear end position of the first object OJ is the tape rear end position when a position separated by a total length of the first margin length XL and a length of the first object OJ in the second direction from the tape front end position is located in the second direction with respect to the object rear end position of the second object OJ, and a position separated by the first margin length XL in the second direction from the object rear end position of the second object OJ is the tape rear end position when the position separated by the total length of the first margin length XL and the length of the first object OJ in the second direction from the tape front end position is not located in the second direction with respect to the object rear end position of the second object OJ.

With this configuration, even when there are the object OJ that is the target of the center arrangement function and an object OJ that is not the target of the center arrangement function in a case in which the tape length automatic function is selected, the PC 1 can generate the print data that obtains the print result utilizing both functions and the arrangement of the object OJ for which the center arrangement function is not set.

What is claimed is:

1. A print data generation apparatus that generates print data for causing a tape printing apparatus to print an object on a tape fed in a first direction, the print data generation apparatus comprising:

- a reception section that receives selection of any one of a tape length fixing function of deciding a tape length to be a fixed length designated by a user and a tape length automatic function of deciding the tape length by setting, as a tape rear end position, a position separated by a margin length in a second direction opposite to the first direction from an object rear end position, which is a position of an end portion of the object in the second direction, and setting, for the object, of a center arrangement function of arranging the object at a center of the tape in the first direction; and
- a generation section that generates the print data, wherein the generation section
  - arranges, when the center arrangement function is set for the object in a case in which the tape length fixing function is selected, the object for which the center arrangement function is set at the center of the tape in the first direction while maintaining the fixed length, and
  - decides, when the center arrangement function is set for the object in a case in which the tape length automatic function is selected, the tape length such that a position separated by the margin length in the first direction from an object front end position, which is a position of an end portion of the object for which the center arrangement function is set in the first direction, is a tape front end position and a position separated by the margin length in the second direction from the object rear end position of the object for which the center arrangement function is set is the tape rear end position, to generate the print data such that the object for which the center arrangement function is set is arranged at the center of the tape in the first direction.

2. The print data generation apparatus according to claim 1, wherein when the center arrangement function is set for a plurality of the objects in a case in which the tape length automatic function is selected, the generation section performs center position alignment in the first direction on the plurality of objects for which the center arrangement function is set, and decides the tape length such that a position separated by the margin length in the first direction from the object front end position of a longest object, which is the object having a longest length in the first direction among the plurality of objects for which the center arrangement function is set is the tape front end position and a position separated by the margin length in the second direction from the object rear end position of the longest object is the tape rear end position.

3. The print data generation apparatus according to claim 2, wherein when the center arrangement function is set for the plurality of objects in a case in which the tape length automatic function is selected, the generation section generates first arrangement data indicating arrangement in which the center position alignment in the first direction is performed on the plurality of objects for which the center arrangement function is set on the tape, generates second arrangement data indicating arrangement in which the plurality of objects on which the center position alignment is performed are moved from the arrangement indicated by the first arrangement data such that the object front end position of the longest object is a position separated by the margin length in the second direction from the tape front end position, and decides the tape length by changing the tape rear end position from the arrangement indicated by the second arrangement data such that the position separated by the margin length in the second direction from the object rear end position of the longest object is the tape rear end position.

4. The print data generation apparatus according to claim 1, wherein the generation section acquires table data and generates, based on a plurality of row data included in the acquired table data, the print data such that a plurality of the objects corresponding to the respective row data are printed, and generates, when the center arrangement function is set for the object corresponding to any one of the row data included in the table data, the print data assuming that the center arrangement function is also set for the object corresponding to another row data included in the table data.

5. The print data generation apparatus according to claim 1, wherein the generation section assigns, when the center arrangement function is set in a state in which the object is selected, and a center arrangement attribute is not assigned to the selected object, the center arrangement attribute to the selected object, and arranges, when the center arrangement function is set, the selected object and the object which is not selected but assigned in advance with the center arrangement attribute at the center of the tape in the first direction.

6. The print data generation apparatus according to claim 5, wherein when a specific operation including at least one of movement and size change is performed on the object assigned with the center arrangement attribute, the generation section cancels the center arrangement attribute.

7. The print data generation apparatus according to claim 1, wherein the generation section does not change, when the center arrangement function is set for a first object and the center arrangement function is not set for a second object in a case in which the tape length automatic function is selected, a position of the second object with respect to the tape front end position, and decides the tape length such that a position separated by the margin length in the second direction from the object rear end position of the first object is the tape rear end position when a position separated by a total length of the margin length and a length of the first object in the second direction from the tape front end position is located in the second direction with respect to the object rear end position of the second object, and a position separated by the margin length in the second direction from the object rear end position of the second object is the tape rear end position when the position separated by the total length of the margin length and the length of the first object in the second direction from the tape front end position is not located in the second direction with respect to the object rear end position of the second object.

8. A control method of a print data generation apparatus that generates print data for causing a tape printing apparatus to print an object on a tape fed in a first direction, the control method comprising:

causing the print data generation apparatus to execute a reception step of receiving selection of any one of a tape length fixing function of deciding a tape length to be a fixed length designated by a user and a tape length automatic function of deciding the tape length by setting, as a tape rear end position, a position separated by a margin length in a second direction opposite to the first direction from an object rear end position, which is a position of an end portion of the object in the second direction, and setting, for the object, of a center arrangement function of arranging the object at a center of the tape in the first direction, and a generation step of generating the print data, wherein in the generation step, when the center arrangement function is set for the object in a case in which the tape length fixing function is selected, the object for which the center arrangement function is set is arranged at the center of the tape in the first direction while maintaining the fixed length, and when the center arrangement function is set for the object in a case in which the tape length automatic function is selected, the tape length is decided such that a position separated by the margin length in the first direction from an object front end position, which is a position of an end portion of the object for which the center arrangement function is set in the first direction, is a tape front end position and a position separated by the margin length in the second direction from the object rear end position of the object for which the center arrangement function is set is the tape rear end position, to generate the print data such that the object for which the center arrangement function is set is arranged at the center of the tape in the first direction.

9. A non-transitory computer-readable storage medium storing a program, the program causing a print data generation apparatus that generates print data for causing a tape printing apparatus to print an object on a tape fed in a first direction, to execute:

a reception step of receiving selection of any one of a tape length fixing function of deciding a tape length to be a fixed length designated by a user and a tape length automatic function of deciding the tape length by setting, as a tape rear end position, a position separated by a margin length in a second direction opposite to the first direction from an object rear end position, which is a position of an end portion of the object in the second direction, and setting, for the object, of a center arrangement function of arranging the object at a center of the tape in the first direction; and a generation step of generating the print data, wherein in the generation step, when the center arrangement function is set for the object in a case in which the tape length fixing function is selected, the object for which the center arrangement function is set is arranged at the center of the tape in the first direction while maintaining the fixed length, and when the center arrangement function is set for the object in a case in which the tape length automatic function is selected, the tape length is decided such that a position separated by the margin length in the first direction from an object front end position, which is a position of an end portion of the object for which the center arrangement function is set in the first direction, is a tape front end position and a position separated by the margin length in the second direction from the object rear end position of the object for which the center arrangement function is set is the tape rear end position, to generate the print data such that the object for which the center arrangement function is set is arranged at the center of the tape in the first direction.

* * * * *